United States Patent
King et al.

(10) Patent No.: US 6,220,329 B1
(45) Date of Patent: Apr. 24, 2001

(54) APPARATUS FOR MAKING LAMINATED ROOFING SHINGLES

(75) Inventors: Thomas M. King, Joplin, MO (US); Devender Swaroop, Frederick, MD (US)

(73) Assignee: Tamko Roofin Products, Joplin, MO (US)

(*) Notice: Subject to any disclaimer, the term of this patent is extended or adjusted under 35 U.S.C. 154(b) by 0 days.

(21) Appl. No.: 09/040,049

(22) Filed: Mar. 17, 1998

(51) Int. Cl.[7] ............... B32B 31/00; E04D 1/12
(52) U.S. Cl. ............... 156/512; 156/260; 156/264; 156/271; 156/517; 52/535; 52/540; 52/554; 52/557; 83/920; 144/13; 53/DIG. 16
(58) Field of Search ............... 156/511, 512, 156/517, 260, 263, 264, 270, 271; 52/535, 540, 554, 557, DIG. 16; 83/920; 144/13; D25/139

(56) References Cited

U.S. PATENT DOCUMENTS

| | | | |
|---|---|---|---|
| D. 247,786 | 4/1978 | Flood | D25/139 |
| D. 309,027 | 7/1990 | Noone et al. | D25/139 |
| D. 366,124 | 1/1996 | Hannah et al. | D25/139 |
| 1,153,418 | 9/1915 | Bird | 52/518 |
| 1,593,095 | 7/1926 | Munro | 52/557 |
| 1,596,272 | 8/1926 | Jordan | 52/521 |
| 1,601,731 | 10/1926 | Flood | 52/555 |
| 1,698,891 | 1/1929 | Overbury | 29/412 |
| 1,705,497 | 3/1929 | Overbury | 52/557 |
| 1,748,981 * | 3/1930 | Harris | 52/518 |
| 1,829,886 | 11/1931 | Yates et al. | 156/260 |
| 1,894,614 | 1/1933 | Wettlaufer | 52/559 |
| 1,894,615 | 1/1933 | Wettlaufer | 52/553 |
| 1,897,139 | 2/1933 | Overbury | 156/93 |
| 1,973,863 * | 9/1934 | Betjeman | 83/43 |
| 3,180,783 | 4/1965 | Walker et al. | 428/148 |
| 3,624,975 | 12/1971 | Morgan et al. | 52/105 |
| 3,921,358 | 11/1975 | Bettoli | 52/314 |
| 3,998,685 | 12/1976 | Czyzewski et al. | 156/260 |
| 4,141,187 | 2/1979 | Graves | 52/173.1 |
| 4,198,257 | 4/1980 | Pfaff | 156/260 |
| 4,226,069 | 10/1980 | Hinds | 52/521 |
| 4,233,100 | 11/1980 | Cunningham et al. | 156/260 |

(List continued on next page.)

FOREIGN PATENT DOCUMENTS 963626    3/1975   (CA).

OTHER PUBLICATIONS

Celotex "Ambassador Shake" Advertisement, Jun. 1997, Contractors Guide, 1 page.
TAMKO "Heritage II" Advertisement, 1993, 2 pages, No Month Available.

(List continued on next page.)

Primary Examiner—Linda L Gray
(74) Attorney, Agent, or Firm—Sidley & Austin

(57) ABSTRACT

A method and apparatus for making laminated roofing shingles includes providing a substantially continuous sheet of shingle material, cutting the sheet material at a first cutting station to define a first pair of longitudinal strips having interdigitating tabs with a first pattern length, further cutting the sheet to define a second pair of longitudinal strips, further cutting the sheet at a second cutting station to define a third pair of strips having interdigitating tabs with a second pattern length, laminating together one of the first pair of strips, one of the second pair of strips and one of the third pair of strips in overlapping relation to form a substantially continuous three-layer laminated strip in which one of the second pair of strips is the lowermost layer and having the tabs of the remaining two strips oriented in a common lateral direction, and cutting the laminated strip into uniform longitudinal lengths whereby laminated roofing shingles are made. The length of the shingles is not an integer multiple of either the first or second pattern lengths.

6 Claims, 14 Drawing Sheets

U.S. PATENT DOCUMENTS

| | | | |
|---|---|---|---|
| 4,274,243 | 6/1981 | Corbin et al. | 52/748.1 |
| 4,284,470 | 8/1981 | Bondoc | 162/123 |
| 4,295,445 | 10/1981 | Kopenhaver | 118/695 |
| 4,322,928 | 4/1982 | Freiborg | 52/521 |
| 4,352,837 | 10/1982 | Kopenhaver | 427/187 |
| 4,523,543 | 6/1985 | Brady et al. | 118/697 |
| 4,559,267 | 12/1985 | Freshwater et al. | 428/352 |
| 4,634,622 | 1/1987 | Jenkins et al. | 428/143 |
| 4,668,315 | 5/1987 | Brady et al. | 156/71 |
| 4,717,614 | 1/1988 | Bondoc et al. | 428/143 |
| 4,729,814 | 3/1988 | Jennus et al. | 156/512 |
| 4,775,440 | 10/1988 | Jennus et al. | 156/260 |
| 4,795,661 | 1/1989 | Bondoc et al. | 427/187 |
| 4,825,616 | 5/1989 | Bondoc et al. | 52/518 |
| 4,848,057 | 7/1989 | MacDonald et al. | 52/518 |
| 4,860,509 | 8/1989 | Laaly et al. | 52/173.3 |
| 4,869,942 | 9/1989 | Jennus et al. | 428/77 |
| 4,900,589 | 2/1990 | Montgomery | 427/188 |
| 4,920,721 | 5/1990 | Pressutti et al. | 52/518 |
| 5,052,162 | 10/1991 | Bush et al. | 52/518 |
| 5,186,980 | 2/1993 | Koschitzky | 427/187 |
| 5,195,290 | 3/1993 | Hulett | 52/518 |
| 5,209,802 | 5/1993 | Hannah et al. | 156/250 |
| 5,347,785 | 9/1994 | Terrenzio et al. | 52/555 |
| 5,369,929 | 12/1994 | Weaver et al. | 52/557 |
| 5,421,134 | 6/1995 | Hannah et al. | 52/518 |
| 5,547,707 | 8/1996 | Haubert et al. | 427/188 |
| 5,571,596 | 11/1996 | Johnson | 428/143 |
| 5,860,263 | 1/1999 | Sieling et al. | 52/518 |
| 5,939,169 | 8/1999 | Bondoc et al. | 428/141 |

OTHER PUBLICATIONS

Celotex "Presidential Shake" Advertisement, Mar. 1995, 6 pages, No Month Available.

TAMKO "Heritage" Advertisement, 1995, 8 pages, No Month Available.

GAF Materials Corporation "Grand Sequoia" Shingles Advertisement, 1996, 6 pages, No Month Available.

* cited by examiner

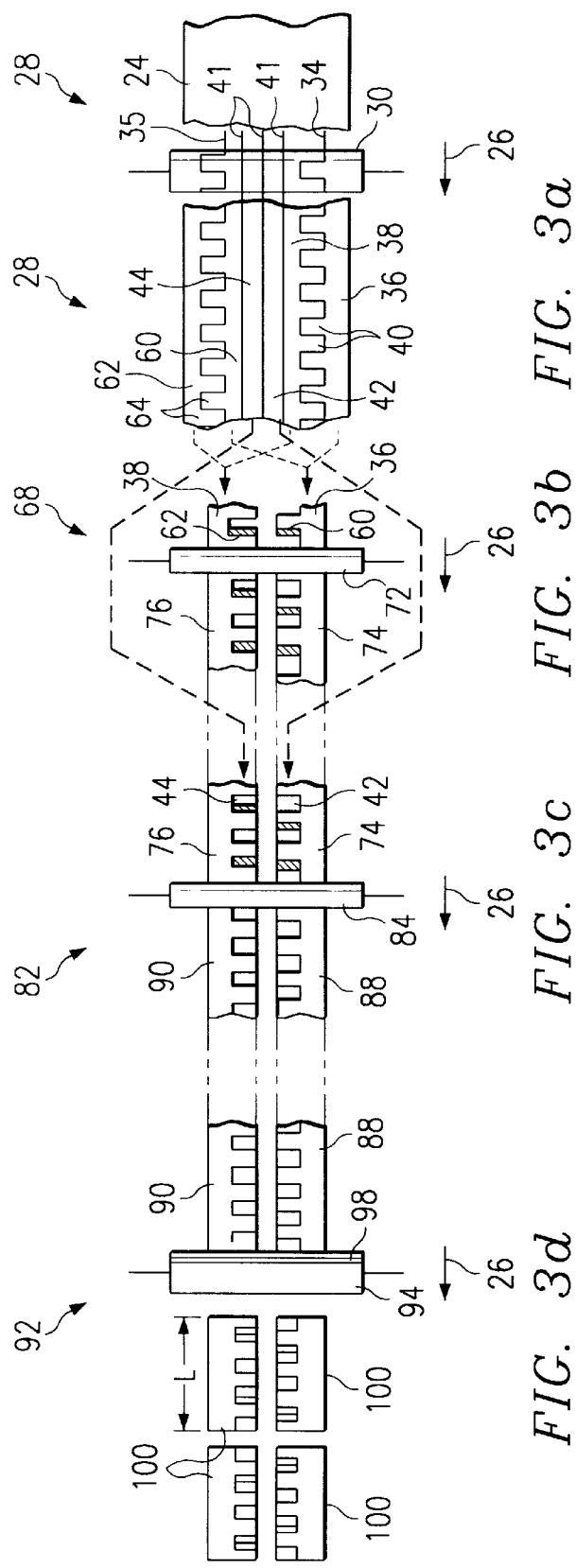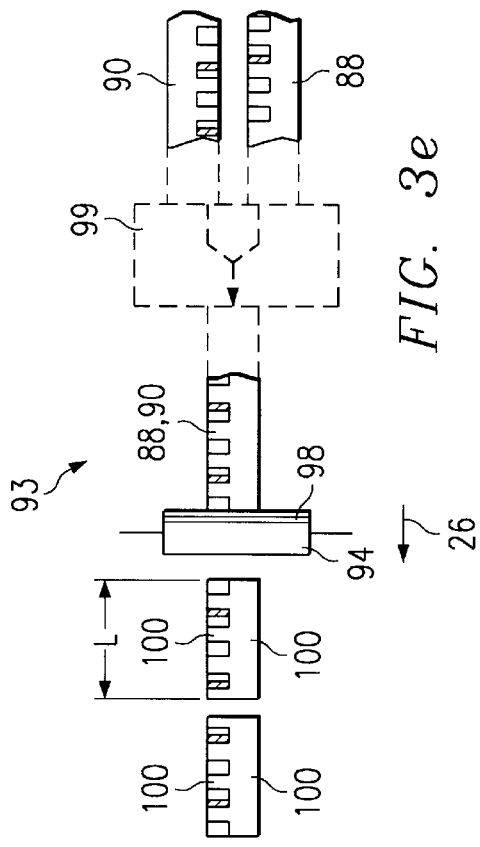

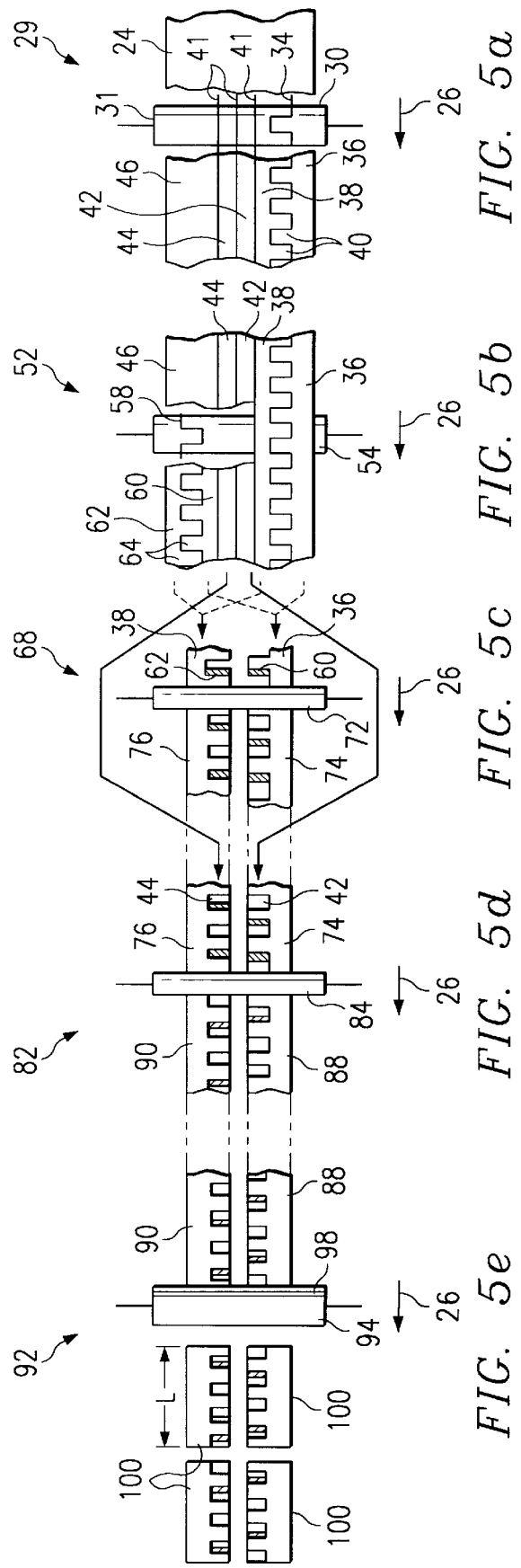

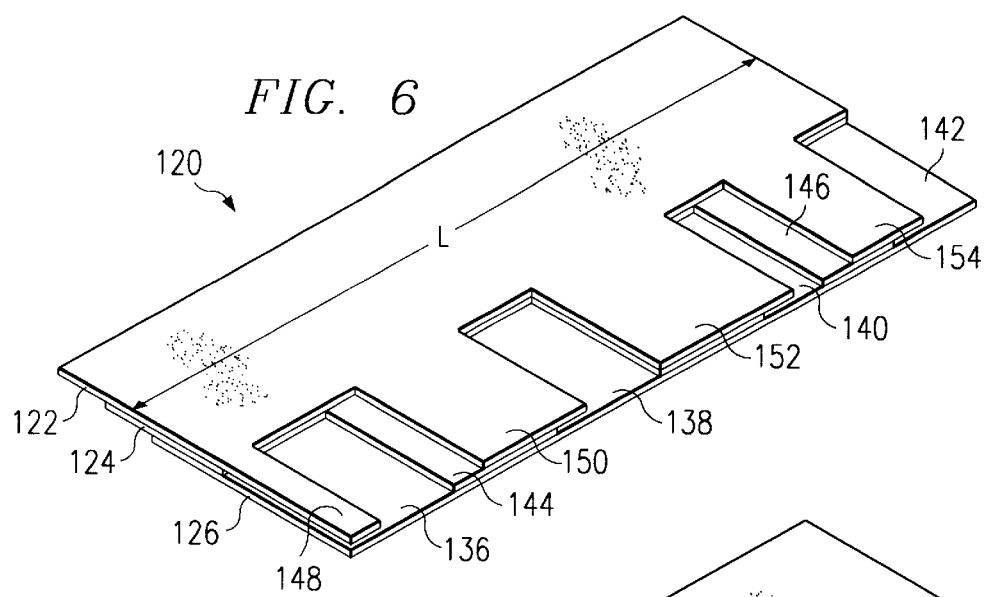
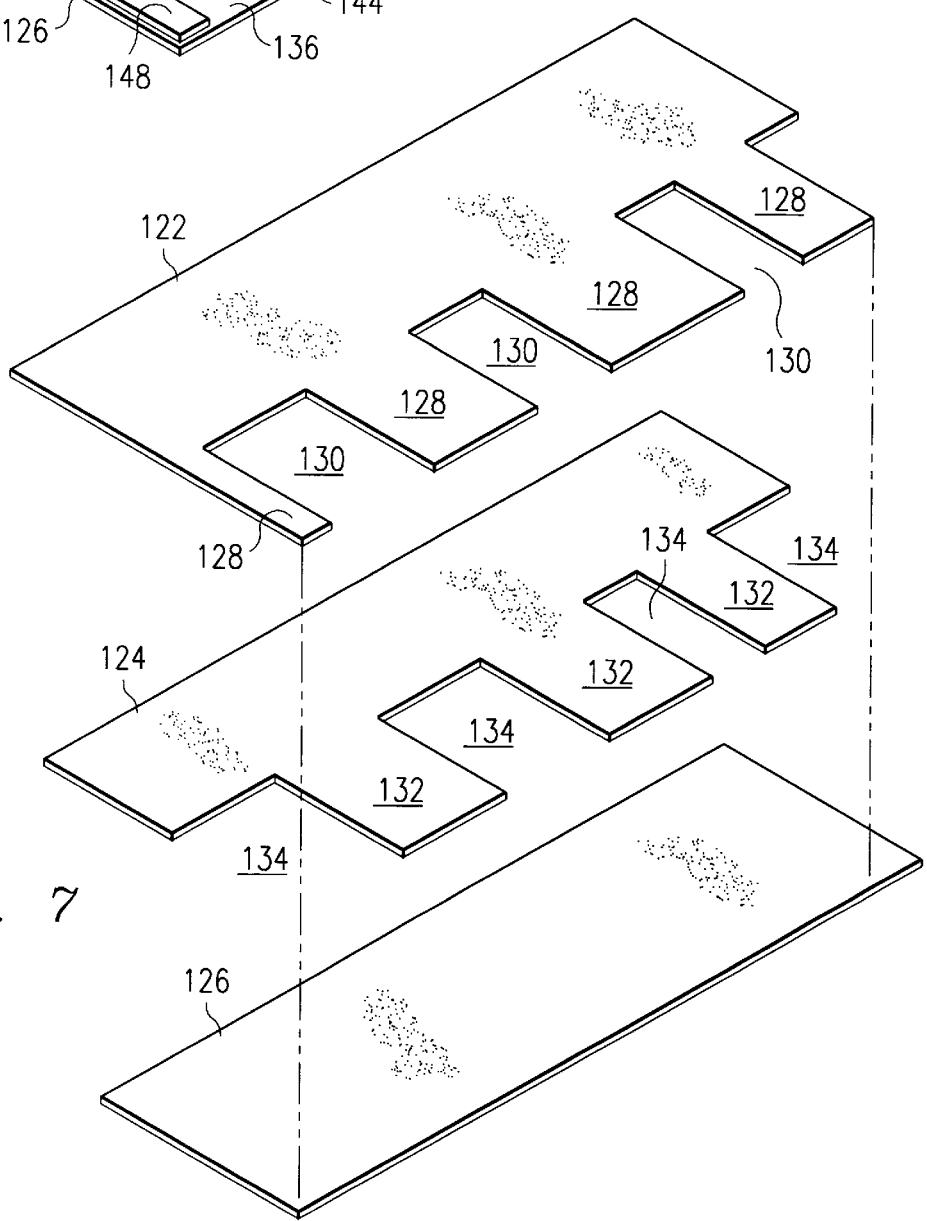

APPARATUS FOR MAKING LAMINATED ROOFING SHINGLES

BACKGROUND OF THE INVENTION

Roofing shingles are used to provide an exterior covering for a roof which is both weather resistant and attractive in appearance. Asphalt composition shingles are a very popular roof covering because of their relatively low cost, ease of installation, and long life. In addition, asphalt composition shingles can be produced in a large variety of colors or color patterns so that the roof of one residential home does not look the same as the neighboring structure.

Despite the many benefits of using asphalt composition shingles, many homeowners desire a roof having the heavily textured appearance of a roof covered with wooden shakes, tiles, or slate shingles. In pursuit of this desirable textured appearance, many asphalt composition shingles have been devised with a tabbed configuration resembling wood shakes. To further enhance the textured appearance, some tabbed shingles are formed from multiple layers of material laminated into a single shingle. Many such shingles are known having two layers of composition material with at least one of the layers being tabbed. Further, for example, U.S. Pat. No. 4,729,814 (and related U.S. Pat. Nos. 4,775, 440 and 4,869,942) discloses a laminated roofing shingle comprising three layers and having exposed tab cutouts two layers thick. Similarly, U.S. Pat. No. 5,195,290 discloses a laminated roofing shingle comprising three layers including tabs and cutouts formed in the upper two layers.

An important factor in achieving a desirable appearance in a roof formed of tabbed asphalt composition shingles is the degree of random variations between the tab configurations of the various shingles. Shingles which have little variations in tab configuration with respect to other shingles on the roof are often perceived as having a bland or cheap appearance, while shingles with many variations in tab configuration will more closely resemble the random texture provided by a shake roof. In addition, the use of shingles with little tab variation or with predictable variation can produce undesirable visual patterns on the roof, for example perceived diagonal lines on the roof known as the zipper effect. It is therefore desirable to produce tabbed asphalt composition shingles having the greatest possible variation in tab configuration.

Conventional two-layer laminated roofing shingles are typically produced by cutting a sheet of asphalt composition material into sets of longitudinal strips, some of which are straight-edged and some of which are tab-edged, at a first station including a combination slitter and tab cutter. The slitter and tab cutter generally comprises a single revolving cutter drum fitted with continuous (i.e., wrap-around) knife edges shaped in the desired pattern to be cut. For example, a slitter is typically a plain (disc-shaped) knife mounted on the drum and used to cut straight-edged strips while a tab cutter is typically a serpentine or zig-zag shaped knife mounted on the same drum and used to cut a line of interdigitating tabs between a pair of tab-edged strips. A single cutter drum usually mounts several sets of knives such that it can make several sets of adjacent straight-edged and tab-edged strips at a single station. After the slitting and tab cutting operation, two-layer laminated strips are formed by overlaying and laminating together one straight-edged longitudinal strip and one tab-edged longitudinal strip at a series of shifting, aligning, and laminating stations. The two-layer laminated longitudinal strips are then cut into uniform lengths in a transverse cutting station to form individual two-layer shingles.

To introduce some variation into the tab configuration, the tab-cutting knife can be patterned to cut a sequence of tabs having slightly different dimensions and/or shapes. However, since the knife pattern on the cutting drum repeats with each revolution of the drum, the cutting drum will always produce the same pattern or sequence of tabs over and over. If the circumference of the cutter drum is the same as the length of the finished shingle, then the same tab pattern will repeat at the same position on every shingle, resulting in a uniform appearance among the shingles. However, to further increase the variation in tab configuration among shingles, it is known to utilize a cutter drum which has a circumference that is different from the length of the finished shingle such that many shingles can be cut before the tab pattern from an earlier shingle is precisely repeated at the same position on a subsequent shingle.

In the three-layer shingles produced by the known method of U.S. Pat. No. 4,729,814, the tab cutter cuts through a two-layer sheet of shingle material to form two-layer tab-edged longitudinal strips. Since the blade of the tab cutter extends radially outward from the surface of the rotating cutting drum, the knife will initially contact the sheet of shingle material at a point some distance ahead of the point of tangency between the surface of the drum and the sheet. This distance results in the knife blade entering the sheet material while moving at an angle to the surface rather than perpendicular to the surface. Due to this inclination, those portions of the blade that are oriented parallel to the axis of rotation of the drum (such as those found on a tab-cutting blade) will tend to crush or gouge the sheet while cutting through. While the extent of such gouging is minimized when cutting a single-layered sheet, the gouging is much more pronounced (and therefore undesired) when sheets having two or more layers are cut. A need therefore exists, for a method and apparatus for making three layer shingles in which the tabs are cut from single-layer sheets of shingle material.

As previously discussed, it is desirable to produce laminated shingles having multiple layers of tabs with a very random tab configuration. Ideally, no two shingles on a roof would have an identical tab configuration. However, when all tabs are cut using tab cutter blades mounted on a single cutting drum, such as in conventional two-layer shingle manufacture and in the three-layer shingles produced by the known method of U.S. Pat. No. 4,729,814, the tabs will have a period of repetition (i.e., the number of shingles that are produced from a strip before another shingle having the same tabs in the same positions is produced) which is based on the relationship between the circumference of the cutter drum and the length of the finished shingle. This relationship limits the variations in tab configuration among the shingles. A need therefore exists, for a method and apparatus for producing laminated roofing shingles having a greater number of variations of tab configurations than existing laminated roofing shingles.

SUMMARY OF THE INVENTION

A method for making multi-layer laminated roofing shingles includes the steps of unwinding a sheet of mat material, coating the mat material with hot asphalt, applying mineral granules to the asphalt-covered surface of the mat and embedding the granules in the hot asphalt to form a sheet of shingle material, cooling the shingle material, cutting and laminating the sheet of shingle material to form a multi-layer laminated longitudinal strip having one or more tab-edged layers, and cutting the multi-layer strip transversely at regular intervals to form finished laminated shingles.

In one aspect, the step of cutting and laminating the sheet includes providing a substantially continuous single-layer sheet of shingle material, cutting the single-layer sheet material to define a first pair of longitudinal strips having interdigitating tabs, a second pair of longitudinal strips, and a third pair of longitudinal strips having interdigitating tabs, laminating together one of the first pair of strips, one of the second pair of strips and one of the third pair of strips in overlapping relation to form a substantially continuous three-layer laminated strip in which one of the second pair of strips is the lowermost layer and having the tabs of the remaining two strips oriented in a common lateral direction.

In another aspect, an apparatus for making three-layer laminated shingles is provided including a cutting drum having a first tab cutter blade for cutting a first portion of a sheet of single-layer shingle material to define a first pair of single-layer longitudinal strips with interdigitating tabs, three disk-shaped slitter blades for cutting a second portion of the sheet to define a second pair of single-layer longitudinal strips, and a second tab cutter blade for cutting a third portion of the sheet to define a second pair of single-layer longitudinal strips with interdigitating tabs.

In a further aspect, the step of cutting and laminating the sheet includes providing a substantially continuous sheet of shingle material, cutting the sheet material at a first cutting station to define a first pair of longitudinal strips having interdigitating tabs with a first pattern length, further cutting the sheet to define a second pair of longitudinal strips, further cutting the sheet at a second cutting station to define a third pair of strips having interdigitating tabs with a second pattern length, the second pattern length being different from the first pattern length, laminating together one of the first pair of strips, one of the second pair of strips and one of the third pair of strips in overlapping relation to form a substantially continuous three-layer laminated strip in which one of the second pair of strips is the lowermost layer and having the tabs of the remaining two strips oriented in a common lateral direction.

In still another aspect, an apparatus for making three-layer laminated shingles is provided including a first cutting drum having a first shingle cutter blade for cutting a first portion of a sheet of single-layer shingle material to define a first pair of longitudinal strips having interdigitating tabs with a first pattern length, a second cutting drum having a second shingle cutter blade for cutting a third portion of the sheet to define a second pair of longitudinal strips having interdigitating tabs with a second pattern length, and three slitter blades mounted on either the first cutting drum or the second cutting drum for cutting the sheet to define a second pair of longitudinal strips.

BRIEF DESCRIPTION OF THE DRAWINGS

A better and more complete understanding of the present invention and advantages thereof will be gained from the following detailed description, claims and accompanying drawings in which:

FIGS. 3a–3d are top plan views of selected portions of the apparatus of FIG. 2, with a portion of the sheet broken away in FIG. 3a to show the cutter drum;

FIG. 3e is a top plan view, similar to FIG. 3d, according to an alternative embodiment of the current invention;

FIGS. 5a–5e are top plan views of selected portions of the apparatus of FIG. 4, with a portion of the sheet broken away in FIG. 5a to show the cutter drum;

FIG. 6 is a perspective view of a laminated roofing shingle produced according to the method of the current invention;

FIG. 7 is a perspective view of the shingle of FIG. 6 with the layers separated to further illustrate their structure;

DETAILED DESCRIPTION

Figure 1:
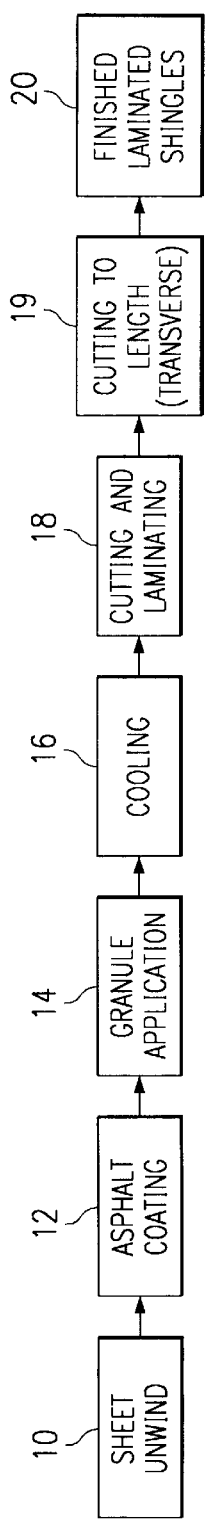
FIG. 1 is a flow diagram useful in describing the method of the current invention.

Referring now to the drawings and more specifically to FIG. 1, there is shown a simplified flow diagram useful in describing the method of making a laminated roofing shingle according to the current invention. It will be readily appreciated that some of the steps of manufacture of the shingle shown in FIG. 1 are conventional and are carried out by well-known standard apparatus to be found in any roofing plant. Therefore, in order to avoid undue complexity and to describe the invention in as concise and complete a fashion as possible, the individual pieces of apparatus, such as motors, bearings, shafts, rolls, conveyors, frames, nuts, bolts, etc., have generally not been described. The current invention resides primarily in the method and apparatus for cutting and laminating the sheet material to form the laminated shingles.

The method of the current invention may be understood by observing the flow diagram of FIG. 1 and following the arrow which represents the shingle material as it goes from its initial condition as a mat of fibers in the form of a roll and as it continues to the finished shingle. FIGS. 8a–8c, 9a, 9b, 10a, 10b, 11a and 11b provide additional description of the method of the current invention by expanding the description of selected operations shown in FIG. 1. It should be noted that while the following description details a method and apparatus for making laminated roofing shingles from asphalt composition material, it will be readily appreciated that virtually any flexible or semi-flexible sheet material can be used to make laminated shingles without departing from the scope of the current invention.

Referring still to FIG. 1, the starting material for the process is typically a mat or web of fibrous material, for example, fiberglass, polyester, or organic felt can be used. Fiberglass is generally preferred, however, if flammability of the shingles is of concern. The initial sheet material is generally supplied by the manufacturer wound into a large roll for storage and handling purposes. The process of the current invention, begins with sheet unwind operation 10 where the sheet is unwound and fed into the head end of the apparatus. In most production operations, the sheet will be threaded through a series of storage loops (not shown) which store a quantity of sheet material sufficient to allow the continuous feeding of the remaining apparatus during the time needed to add a new roll at the sheet unwind station.

The sheet next proceeds continuously to an asphalt saturating or coating operation 12 where hot asphalt is applied to the top and bottom of the moving sheet in a conventional way well known to those in the roofing industry. The asphalt coated sheet next proceeds continuously to a granule application operation 14 in which mineral granules are embedded into the asphalt coating on the top of the sheet. The mineral granules are typically applied so as to form preselected patterns on the sheet material corresponding to various portions of the finished shingle. The mechanisms used for depositing the granules onto the moving asphalt coated sheet are also well known in the industry and will not be further described.

After application of the mineral granules, the sheet proceeds continuously to a cooling operation 16 where the temperature of the sheet is reduced and the mineral granules are firmly embedded in the asphalt material. In many production operations, the cooling station comprises storage loops (not shown) which can accommodate several minutes worth of sheet production so that the continuous asphalt coating operation 12 will not be disrupted by temporary problems in the portion of the apparatus downstream of the cooling operation.

The sheet material leaving cooling operation 16 typically is a finished single-layer asphalt composition shingle stock of the type used in many conventional single- and multi-layer asphalt roofing shingles. In the method and apparatus of the current invention, however, this single layer asphalt composition shingle material proceeds into a cutting and laminating operation 18 which, as will be more fully described below, transforms the single layer shingle stock into a three-layer longitudinal strip which can be cut at regular intervals at a cutting station 19 to form finished laminated shingles 20 having a very high number of different tab configurations.

Figure 2:
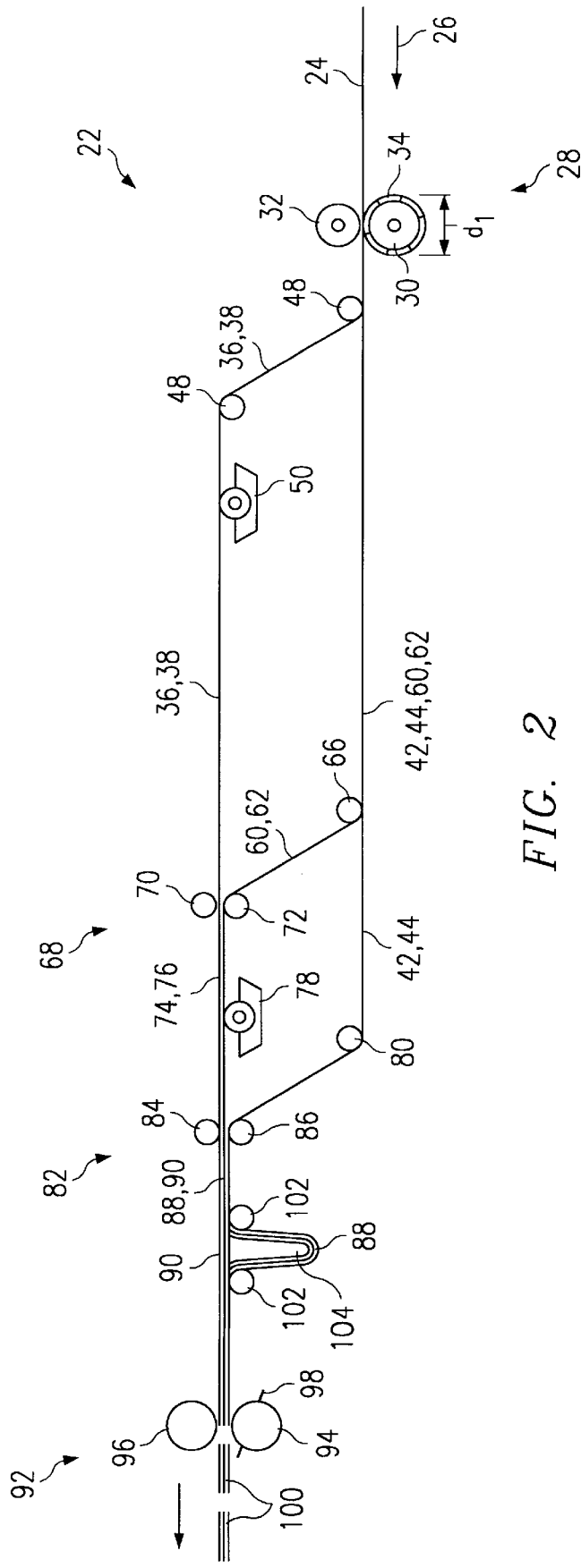
FIG. 2 is a simplified elevational view of an apparatus for cutting and laminating a sheet material into laminated roofing shingles according to one aspect of the current invention.

Referring now to FIG. 2, a cutting and laminating apparatus 22 according to one aspect of the current invention is shown. This apparatus 22 can be used to perform the cutting and laminating operation designated by reference number 18 in FIG. 1. FIGS. 3a–3d show top plan views of selected portions of cutting and laminating apparatus 22 to further illustrate significant parts of the invention. Referring now specifically to FIG. 2 and FIG. 3a, the uncut sheet of shingle material 24 leaves the cooling operation 16 (FIG. 1) and travels in the direction indicated by arrow 26 as it enters apparatus 22 at cutting station 28. Cutting station 28 comprises a cutter drum 30 and an anvil drum 32 spaced apart from one another to create a narrow gap, also known as a nip, through which the sheet material 24 passes. For purposes of illustration, the anvil drum 32 and a portion of sheet material 24 are broken away in FIG. 3a to show the cutter drum 30 below. The cutter drum 30 includes first and second tab cutter knives 34 and 35, respectively, and a plurality of slitter knives 41 embedded in the drum surface for cutting the single-layer sheet 24 as it passes through the nip.

The first tab cutter knife 34 has a first zig-zag configuration (also known as a dragon's teeth configuration) for cutting a first portion of sheet 24 as it passes through the gap to define a first pair of substantially continuous longitudinal strips 36, 38 having interdigitating tabs 40. The tabs 40 define a first tab pattern corresponding to the configuration of knife 34. While knife 34 can define a tab pattern having tabs which are of uniform dimensions and spacing, in the preferred embodiment, the tabs so defined are of variable dimensions and spacing.

The slitter knives 41 have a disk-shaped configuration for cutting a second portion of sheet 24 as it passes through the nip to define a second pair of straight-edged longitudinal strips, namely, strips 42 and 44. In the preferred embodiment, three slitter knives 41 are mounted on cutter drum 30.

The second tab cutter knife 35 has a second zig-zag or dragon's teeth configuration for cutting a third portion of sheet 24 as it passes through the nip to define a second pair of substantially continuous longitudinal strips 60, 62 having interdigitating tabs 64. The tabs 64 define a second tab pattern corresponding to the configuration of knife 35. While knife 35 can define a tab pattern having tabs which are of uniform dimensions and spacing, in the preferred embodiment the tabs so defined are of variable dimensions and spacing. Further, the second tab pattern defined by second shingle cutter knife 35 can be different in dimensions, spacing, or both, from the first tab pattern defined by first shingle cutter knife 34, to provide added variation to the resulting shingles.

While, in the preferred embodiment just described, the strips 36, 38, 42, 44, 60, and 62 are all cut from sheet material 24 at a single cutting station 28 having knives 34, 35 and 41 mounted on a single cutting drum 30, it will be readily apparent that other embodiments in which these strips are cut from sheet 24 at successive stations by knives mounted on separate cutting drums are within the scope of the current invention.

Referring still to FIG. 2, after passing through cutting station 28, the strips 36, 38, 42, 44, 60 and 62 are routed around a series of separator rolls 48 which separate the first pair of strips 36, 38 from the remaining strips 42, 44 60 and 62. The method of the current invention includes applying an adhesive to one side of the first strips 36, 38. In the preferred embodiment the first pair of strips, 36, 38 pass over an adhesive coating station 50 immediately after separation from the other strips, however, it will be readily apparent that the order of this and certain subsequent steps can be rearranged somewhat without departing from the scope of the current invention. After separation of the first pair of strips 36, 38, the second and third pairs of strips 42, 44 and 60, 62, respectively, are subsequently routed around a second separator roll 66 to separate the second pair of strips 42, 44 from the third pair of strips 60, 62.

Referring now also to FIG. 3b, the first laminating station 68 comprises a pair of laminating rolls 70, 72 into which are routed the first pair of strips 36, 38 and the third pair of strips 60, 62 for lamination. Before the lamination can occur, however, one of the first pair of strips, for example, strip 36, is shifted vertically and laterally (using equipment and techniques already well known in the industry) and put in an overlapping relation with one of the third pair of strips, for example strip 60, and another of the first pair of strips, for example strip 38, is brought into overlapping relation with another of the third pair of strips, for example strip 62. For purposes of illustration, the lateral and vertical shifting of the strips is represented in this application by dashed line arrows in FIGS. 3a–3e and FIGS. 5a–5e. In selecting the strips from the first pair and the third pair to be combined, care must be taken to assure that the tabs 40, 64 on each set of overlapping strips are oriented in the same lateral direction. As each of the overlapping strips passes between the laminating rolls 70, 72 of the first laminating station 68 (the adhesive for lamination having previously been applied to the underside of the first pair of strips at adhesive application station 50), a two-layer laminated strip will be formed. In the preferred embodiment shown in FIG. 3b, a two-layer laminated strip 74 is formed from strips 36 and 60, while a two-layer laminated strip 76 is be formed from strips 38 and 62. For purposes of illustration, some of the underlying layers in the strips shown in FIGS. 3b–3d are shown with a cross-hatched shading so that they can be better distinguished.

Once the two-layer laminated strips 74, 76 have been formed, an adhesive is applied to the still-exposed bottom side of the third pair of strips 60, 62 which are incorporated as the bottom layers of the two-layer laminated strips 74, 76. In the preferred embodiment shown in FIG. 2, this is accomplished by passing the two-layer laminated strips 74, 76 across a second adhesive application station 78.

Referring now also to FIG. 3c, to complete the step of laminating together one of the first pair of strips, one of the second pair of strips, and one of the third pair of strips in overlapping relation to form a substantially continuous three-layer laminate strip, the second pair of strips 42, 44 will be routed around rolls 80, shifted vertically and laterally as necessary, and brought into overlapping relation under the two-layer laminate strips 74, 76 which have previously had an adhesive applied at laminating station 78. One of the second pair of strips, for example strip 42, will be placed under one of the two-layer laminates, for example strip 74, and another of the second pair of strips, for example strip 44, will be placed under another of the two-layer laminated strips, for example, strip 76. These strips will then be passed through a second laminating station 82. As with the previous laminating station, second laminating station 82 comprises laminating rolls 84, 86 which apply pressure to the strips passing therebetween, forming two three-layer laminate strips, namely strip 88 formed from the lamination of strip 42 and strip 74 (incorporating strips 36 and 60) and three-layer strip 90 formed from the lamination of strip 44 and strip 76 (incorporating strips 38 and 62). After exiting the second laminating station 82, the two three-layer laminated strips 88, 90 will each comprise a lower layer, a tabbed middle layer having one of a first tab pattern and a second tab pattern, and a tabbed top layer having another of the first tab pattern and the second tab pattern. For example, the three-layer laminated strip 88 shown in FIG. 3c has a middle layer 60 with a second tab pattern produced by second tab cutter knife 35 and a top layer 36 having a first tab pattern produced by first tab cutter knife 34. Since the tab patterns of the top layer and the middle layer are different, a large number of shingles will be produced before the repetition of a shingle having an identical two-layer tab configuration.

Referring now also to FIG. 3d, the three-layer laminated strips 88, 90 proceed to a third cutting station 92 comprising a third cutter drum 94 and an anvil drum 96. At this station, cutter drum 94 is equipped with one or more lateral cut-off blades 98 for cutting the laminated strips 88, 90 into uniform longitudinal lengths, L, forming individual laminated roofing shingles 100. This portion of the apparatus corresponds primarily to the operations designated by reference number 19 in FIG. 1. The individual shingles 100 can then be stacked, bundled, and wrapped for shipping using packer equipment (not shown) as is known in the industry.

In order to further enhance the variation between individual shingles 100, in the preferred embodiment shown in FIG. 2, accessory rolls 102 are used to route one of the three-layer laminated strips, in this case, strip 88, into an offset storage loop 104 which will slightly delay the finishing of the shingles from the affected strip such that the finished shingles from strip 88 and strip 90 will originate from different longitudinal points on the original sheet of shingle material 24 (FIG. 3a).

In an alternative embodiment shown in FIG. 3e, a third cutting station 93 can be provided in which the two three-layer laminated strips 88, 90 proceed to a shifter 99 which aligns the strips 88, 90 one above the other before they are cut to length by the lateral cut-off blades 98 to form individual shingles 100. This arrangement allows the shingles to be packed using single-lane packed equipment (not shown). This alternative is especially desirable if single-lane packer equipment is already available for use.

Figure 8A:
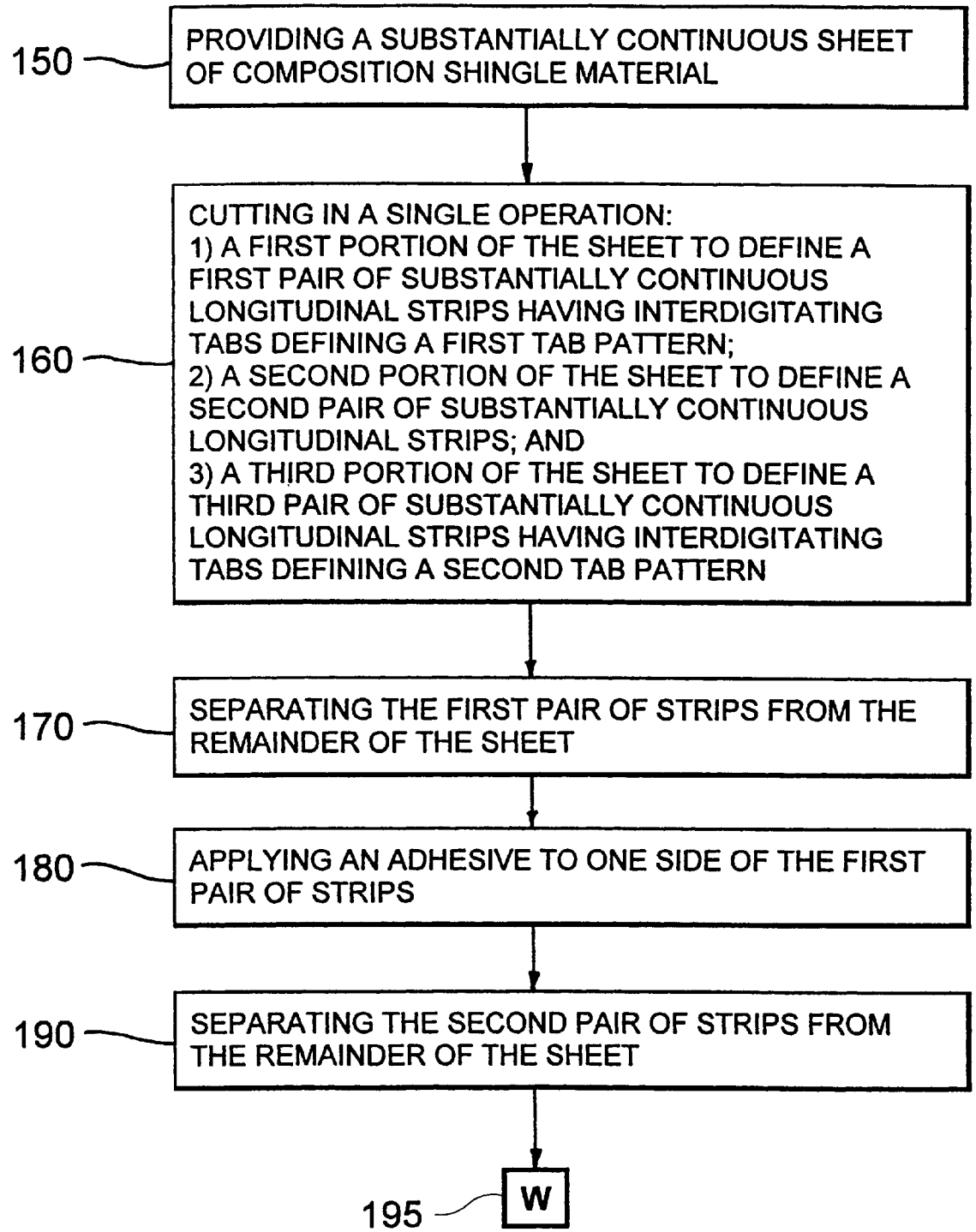
FIGS. 8a–8b are a block diagram of a method for producing laminated roofing shingles according to one aspect of the current invention.
Figure 8B:
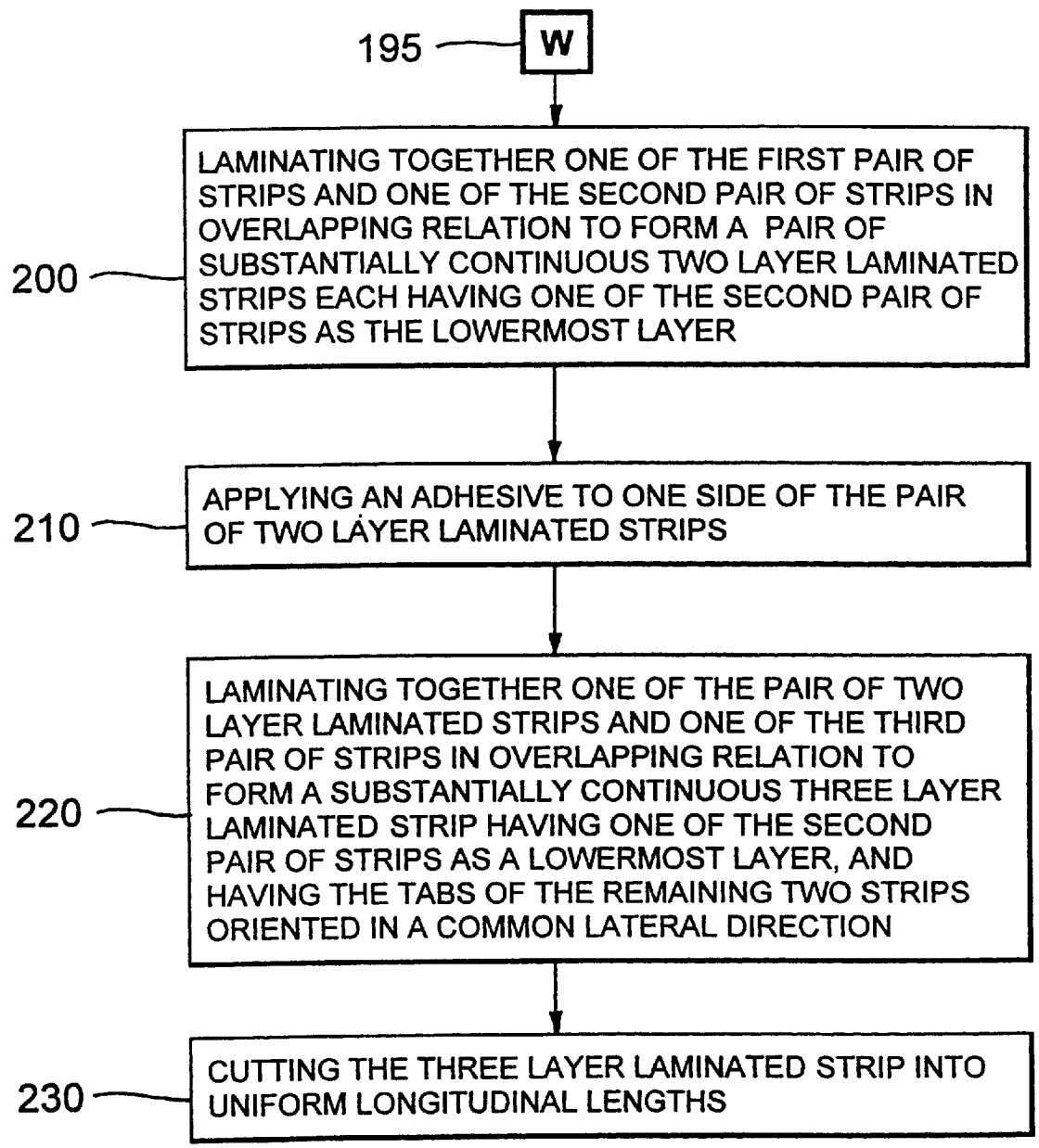

Referring now to FIGS. 8a–8b, a block diagram is provided which illustrates a method for making laminated roofing shingles according to one aspect of the current invention. This method can be practiced on the apparatus previously described and illustrated in FIG. 2 and FIGS. 3a–3e, however, it will be readily appreciated that equivalent apparatus can be used to perform the indicated steps. The first step of the method of the current invention, shown in block 150, is providing a substantially continuous sheet of composition shingle material. This sheet may be produced by any means known in the art, including the process previously described and illustrated in blocks 10, 12, 14 and 16 of FIG. 1. Another step in the current method, shown by block 160, is cutting in a single operation: (1) a first portion of the sheet to define a first pair of substantially continuous longitudinal strips having interdigitating tabs defining a first tab pattern; (2) a second portion of the sheet to define a second pair of substantially continuous longitudinal strips; and (3) a third portion of the sheet to define a third pair of substantially continuous longitudinal strips having interdigitating tabs defining a second tab pattern. This operation can be performed by a cutting station apparatus 28 as previously described and shown in FIG. 2 and FIG. 3a, or by equivalent apparatus.

Another step in the method, shown by block 170, is separating the first pair of strips from the remainder of the sheet. This operation can be accomplished by separator rolls 48 as previously described and shown in FIG. 2 or by equivalent apparatus. Another step in the method, shown by block 180, is applying an adhesive to one side of the first pair of strips. Apparatus for performing this step can comprise an adhesive coating station 50 as previously described and shown in FIG. 2, or equivalent apparatus.

Another step in the method, shown by block 190, is separating the second pair of strips from the remainder of the sheet. This operation may be performed by separator rolls 66 as previously described and shown in FIG. 2, or by equivalent apparatus.

The next block, designated block 195 and containing the reference letter "W", does not actually represent a step in the method, but rather is used to connect the block diagram on FIG. 8a to the block diagram on FIG. 8b which illustrates additional steps of the method. Referring now also to FIG. 8b, another step in the method, designated by block 200, is laminating together one of the first pair of strips and one of the second pair of strips in overlapping relation to form a pair of substantially continuous two-layer laminated strips each having one of the second pair of strips as the lowermost layer. This operation can be performed by a first laminating station 68 as previously described and shown in FIG. 2 and FIG. 3b, or by equivalent apparatus.

Another step in the method, shown by block 210, is applying an adhesive to one side of the pair of two-layer laminated strips. This operation can be performed by a second adhesive application station 78, as shown in FIG. 2, or by equivalent apparatus.

Another step in the method, shown in block 220, is laminating together one of the pair of two-layer laminated strips and one of the third pair of strips in overlapping relation to form a substantially continuous three-layer laminated strip having one of the second pair of strips as a lowermost layer and having the tabs of the remaining two strips orientated in a common lateral direction. This operation can be performed by a second laminating station 82 as previously described and shown in FIG. 2 and FIG. 3c, or by equivalent apparatus.

The final step in the current method, shown by block 230, is cutting the three-layer laminated strip into uniform longitudinal lengths, thus forming individual laminated shingles. This operation can be performed by third cutting station 92 as previously described and shown in FIG. 2 and FIG. 3d, or by equivalent apparatus.

Figure 8C:
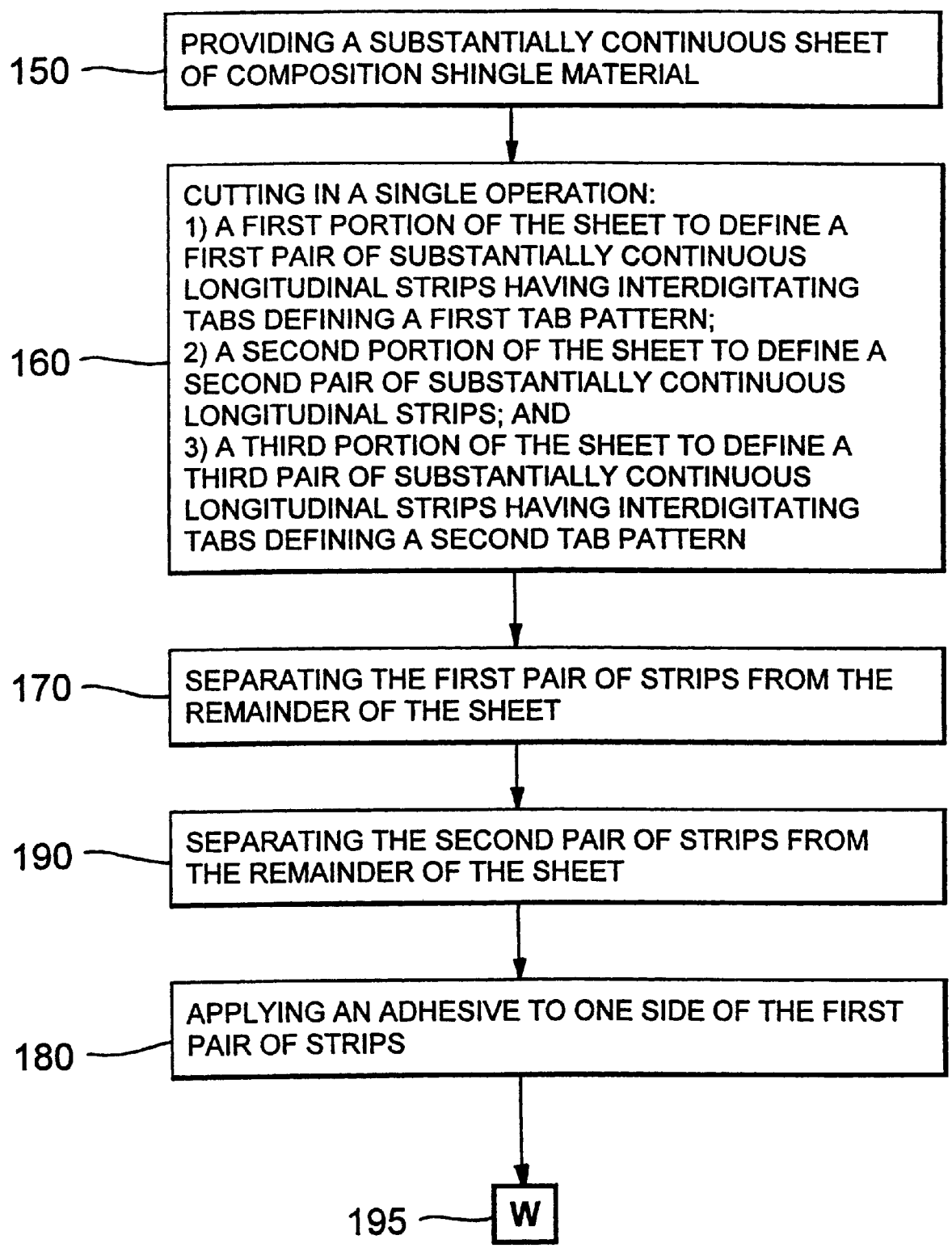
FIG. 8c is a block diagram, similar to FIG. 8a, according to an alternative embodiment of the current invention.

It will be readily appreciated that some of the steps in the method illustrated in FIGS. 8a–8b can be performed in a different sequence without departing from the scope of the current invention. For example, the block diagram shown in FIG. 8c illustrates an alternative embodiment of the current invention, similar to that shown in FIG. 8a, except the order of the steps shown in blocks 180 and 190 have been reversed. Those skilled in the art will understand how the apparatus shown in FIG. 2 and FIGS. 3a–3e can be modified to perform some of the steps in a different order, for example, as shown in FIG. 8c.

Figure 4:
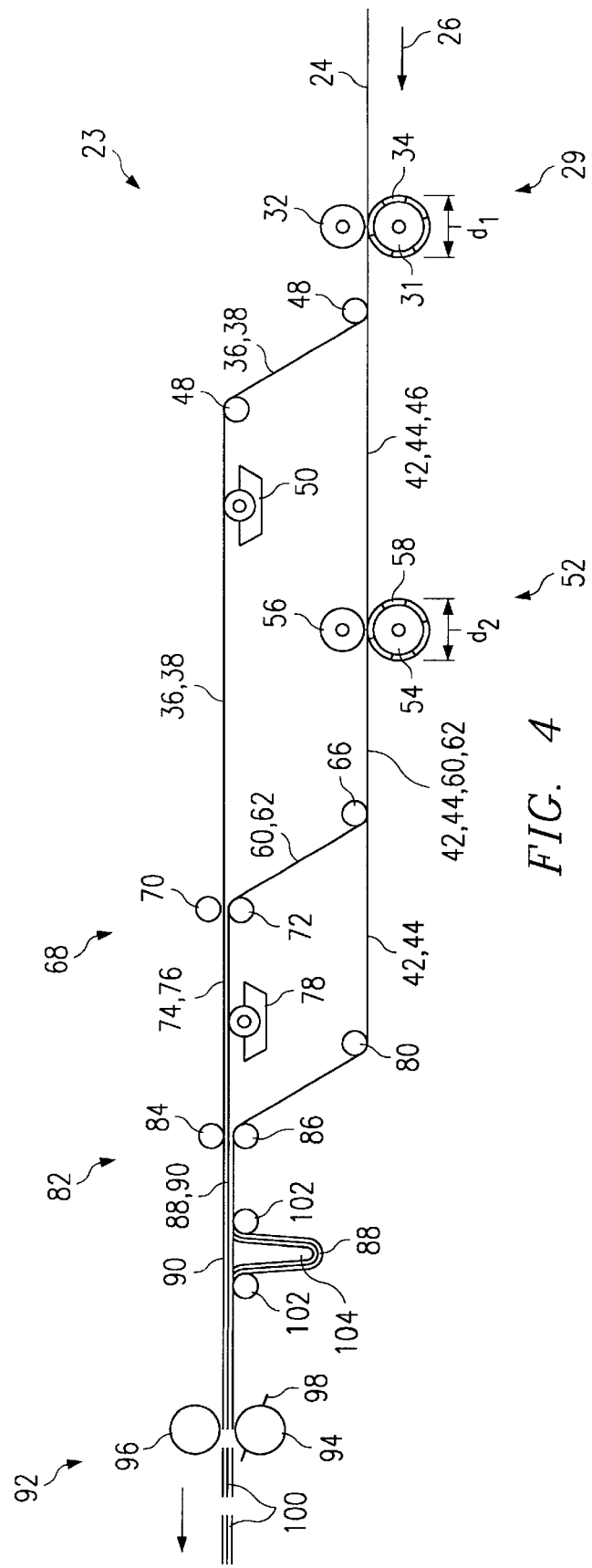
FIG. 4 is a simplified elevational view of an apparatus for cutting and laminating a sheet material into laminated roofing shingles according to another aspect of the current invention.

Referring now to FIG. 4, a cutting and laminating apparatus 23 is shown corresponding to another aspect of the current invention which provides for increased variation in the pattern of the tabs on the finished shingles. The apparatus 23 can be used in the cutting and laminating operation designated by reference numeral 18 and the transverse cutting operation designated by reference numeral 19 in FIG. 1. FIGS. 5a–5e show top plan views of selected portions of cutting and laminating apparatus 23 to further illustrate significant parts of the invention. Many parts of the apparatus 23 are identical to those previously described for the apparatus 22 of FIG. 2 and FIGS. 3a–3d, and such identical parts are identified with the same reference numbers.

Referring now specifically to FIG. 4 and FIG. 5a, the uncut sheet of shingle material 24 leaves the cooling operation 16 (FIG. 1) and travels in the direction indicated by arrow 26 as it enters apparatus 23 at a first cutting station 29. First cutting station 29 comprises a first cutter drum 31 and an anvil drum 32 spaced apart from one another to create a cutting nip through which the sheet material 24 passes. For purposes of illustration, the anvil drum 32 and a portion of sheet material 24 are broken away in FIG. 5a to show the first cutter drum 31 below. The first cutter drum 31 includes a first zig-zag knife 34 embedded in the drum surface for cutting a first portion of sheet 24 as it passes through the nip between the cutter drum 31 and the anvil drum 32 to define a first pair of substantially continuous longitudinal strips 36, 38 having interdigitating tabs 40. The tabs 40 define a first tab pattern corresponding to the configuration of knife 34 and have a first pattern length (i.e., the length of shingle material 24 which will pass through the first cutting station 29 before the tab pattern repeats) that is equal to the circumference of the first cutter drum 31. Alternatively, the first pattern length may be expressed as n times the diameter, d1, of the first cutter drum 31.

The method of the current invention also requires the cutting of a second portion of the sheet material 24 to define a second pair of substantially continuous longitudinal strips. The second pair of strips can be cut at the first cutting station 29 or at a subsequent station of the apparatus. In the preferred embodiment illustrated in FIG. 4 and FIG. 5a, however, the first cutter drum 31 includes three disk-shaped knives 41 cutting a second portion of sheet 24 to define the second pair of single-layer longitudinal strips, namely, strips 42 and 44. The remainder of sheet 24, denoted by reference number 46, passes through the first cutting station 29 without modification.

Referring again to FIG. 4, after passing through first cutting station 29, the sheet material is routed around a series of separator rolls 48 which separate the first pair of interdigitated strips 36, 38 from the second pair of straight-edged strips 42, 44 (if they were cut at first station 29) and the remainder of the sheet 46. The method of the current invention further includes applying an adhesive to one side of the first pair of strips 36, 38. In the preferred embodiment shown in FIG. 4, the first pair of strips 36, 38 passes over an adhesive coating station 50 immediately after separation from the remainder of the sheet, however, it will be readily appreciated that the order of this and certain subsequent steps may be rearranged somewhat without departing from the scope of the current invention.

Referring still to FIG. 4, but now referring also to FIG. 5b, after separation from the first pair of strips 36, 38, the second pair of strips 42, 44 (if they were cut at first station 29) and the remainder of the sheet 46, proceed to a second cutting station 52. Second cutting station 52 is similar to first cutting station 29, having a second cutter drum 54 and an anvil drum 56 spaced apart from one another to define a cutting nip therebetween through which the sheet material (now without the first pair of strips 36, 38) passes through. The second cutter drum 54 includes a second zig-zag knife 58 for cutting the remaining portion 46 of the sheet 24 to define a third pair of substantially continuous longitudinal strips 60, 62 having a series of interdigitating tabs 64. The tabs 64 define a second tab pattern corresponding to the configuration of knife 58 and having a second pattern length equal to the circumference of second cutter drum 54. Where second cutter drum 54 has a diameter $d_2$, then the second pattern length will be given by $\pi \times d_2$. In a significant aspect of the current invention, the second pattern length, $\pi \times d_2$, can be different from the first pattern length, $\pi \times d_1$, or stated alternatively, the diameter of the second cutter drum, $d_2$, can be different from the diameter of the first cutter drum, $d_1$. In another aspect of the current invention, both the first pattern length, $\pi \times d_1$, and the second pattern length, $\pi \times d_2$, will be different than the length, L, of the finished shingle (FIG. 5e).

It should be noted, that in embodiments where the second pair of strips 42, 44 is not cut at the first cutting station 29, then the second pair of strips may be cut at the second cutting station 52 by means of the addition of appropriate disk-shaped knives or slitters on the second cutter drum 54. Alternatively, the second pair of strips 42, 44 could be cut at a separate cutting station (not shown).

After passing through second cutting station 52, the resulting sheet material (strips 42, 44, 60 and 62) is routed around a separator roll 66 to separate the second pair of strips 42, 44 from the third pair of strips 60, 62.

The three pairs of strips now pass through adhesive stations 50, 78, and first and second laminating stations 68, 82 in a manner similar to that previously described for apparatus 22. Referring to FIG. 5c, a first laminating station 68 is shown comprising a pair of laminating rolls 70, 72 into which are routed the first pair of strips 36, 38 and the third pair of strips 60, 62 for lamination. Before the lamination can occur, however, each of the first pair of strips 36, 38 is shifted vertically and laterally as is known in the industry and put in an overlapping relation with one of the third pair of strips 60, 62 as previous described, including orienting the tabs 40, 64 on each set of overlapping strips in the same lateral direction. As each of the overlapping strips passes between the laminating rolls 70, 72 of the first laminating station 68 (the adhesive for lamination having previously been applied to the first pair of strips at adhesive application station 50), a two-layer laminated strip will be formed. In the preferred embodiment shown in FIG. 5c, a two-layer laminated strip 74 will be formed from strips 36 and 60, while a two-layer laminated strip 76 will be formed from strips 38 and 62.

Once the two-layer laminated strips 74, 76 have been formed, an adhesive is applied to the still-exposed bottom side of the third pair of strips 60, 62 which are incorporated as the bottom layers of the two-layer laminated strips 74, 76. In the preferred embodiment shown in FIG. 4, this is accomplished by passing the two-layer laminated strips 74, 76 through a second adhesive application station 78.

Referring now also to FIG. 5d, to complete the step of laminating together one of the first pair of strips, one of the second pair of strips, and one of the third pair of strips in overlapping relation to form a substantially continuous three-layer laminate strip, the second pair of strips 42, 44 will be routed around roll 80, shifted vertically and laterally as necessary, and brought into overlapping relation under the two-layer laminate strips 74, 76 which have previously had an adhesive applied to their undersides at laminating station 78. As previously described, one of the second pair of strips, for example strip 42, will be placed under one of the two-layer laminates, for example strip 74, and another of the second pair of strips, for example strip 44, will be placed under another of the two-layer laminated strips, for example, strip 76. These strips will then be passed through a second laminating station 82. As with the first laminating station, second laminating station 82 comprises laminating rolls 84, 86 which apply pressure to the strips passing therebetween, forming two three-layer laminate strips, namely strip 88 formed from the lamination of strip 42 and strip 74 (incorporating strips 36 and 60) and three-layer strip 90 formed from the lamination of strip 44 and strip 76 (incorporating strips 38 and 62).

After exiting the second laminating station 82, the two three-layer laminated strips 88, 90 will each comprise a lower layer, a tabbed middle layer in which the tabs have one of a first pattern length and a second pattern length, and a tabbed top layer, in which the tabs have another of the first pattern length and the second pattern length. For example, the three-layer laminated strip 88 shown in FIG. 5d has a middle layer 60 with a second pattern length, $\pi \times d_2$, produced by the knife 58 on second cutter drum 54 and a top layer 36 having a first pattern length, $\pi \times d_1$, cut by the knife 34 on first cutter drum 31. Since the pattern length of the top layer and the middle layer can be different, an extremely high number of shingles will be produced before the repetition of a shingle having an identical two-layer tab configuration.

Referring now also to FIG. 5e, the three-layer laminated strips 88, 90 proceed to a third cutting station 92 comprising a third cutter drum 94 and an anvil drum 96. At this station, corresponding generally to the transverse cutting operation designated by reference number 19 in FIG. 1, cutter drum 94 is equipped with one or more transverse cut-off blades 98 for cutting the laminated strips 88, 90 into uniform longitudinal lengths, L, forming individual laminated roofing shingles 100.

In order to further enhance the variation between individual shingles 100, in the preferred embodiment shown in FIG. 4, accessory rolls 102 can be used to route one of the three-layer laminated strips, in this case, strip 88, into an offset storage loop 104 which will slightly delay the finishing of the shingles from the affected strip such that the finished shingles from strip 88 and strip 90 will originate from different longitudinal points on the original sheet of shingle material 24 (FIG. 5a).

Figure 9A:
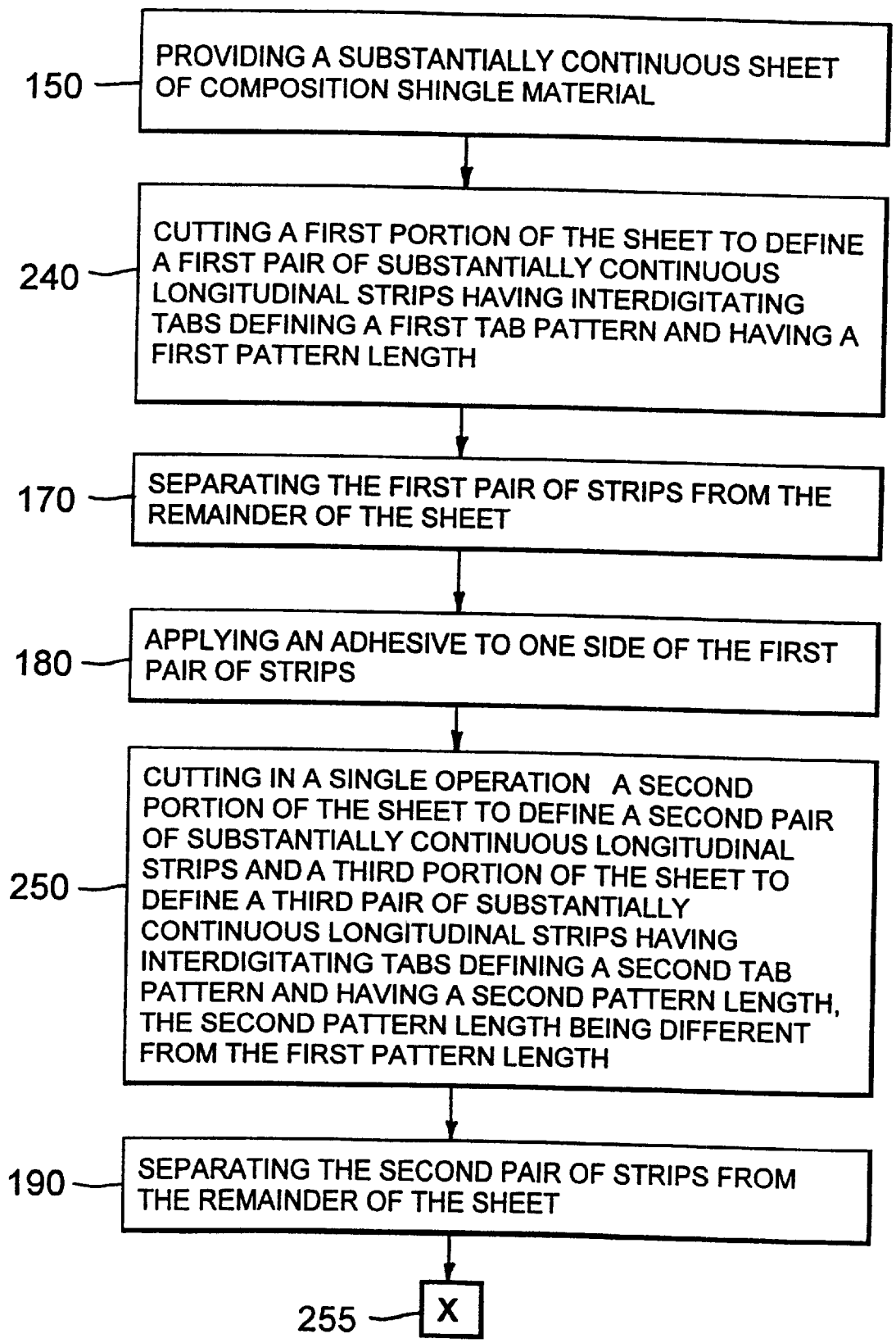
FIGS. 9a–9b are a block diagram of a method for producing laminated roofing shingles according to another aspect of the current invention.
Figure 9B:
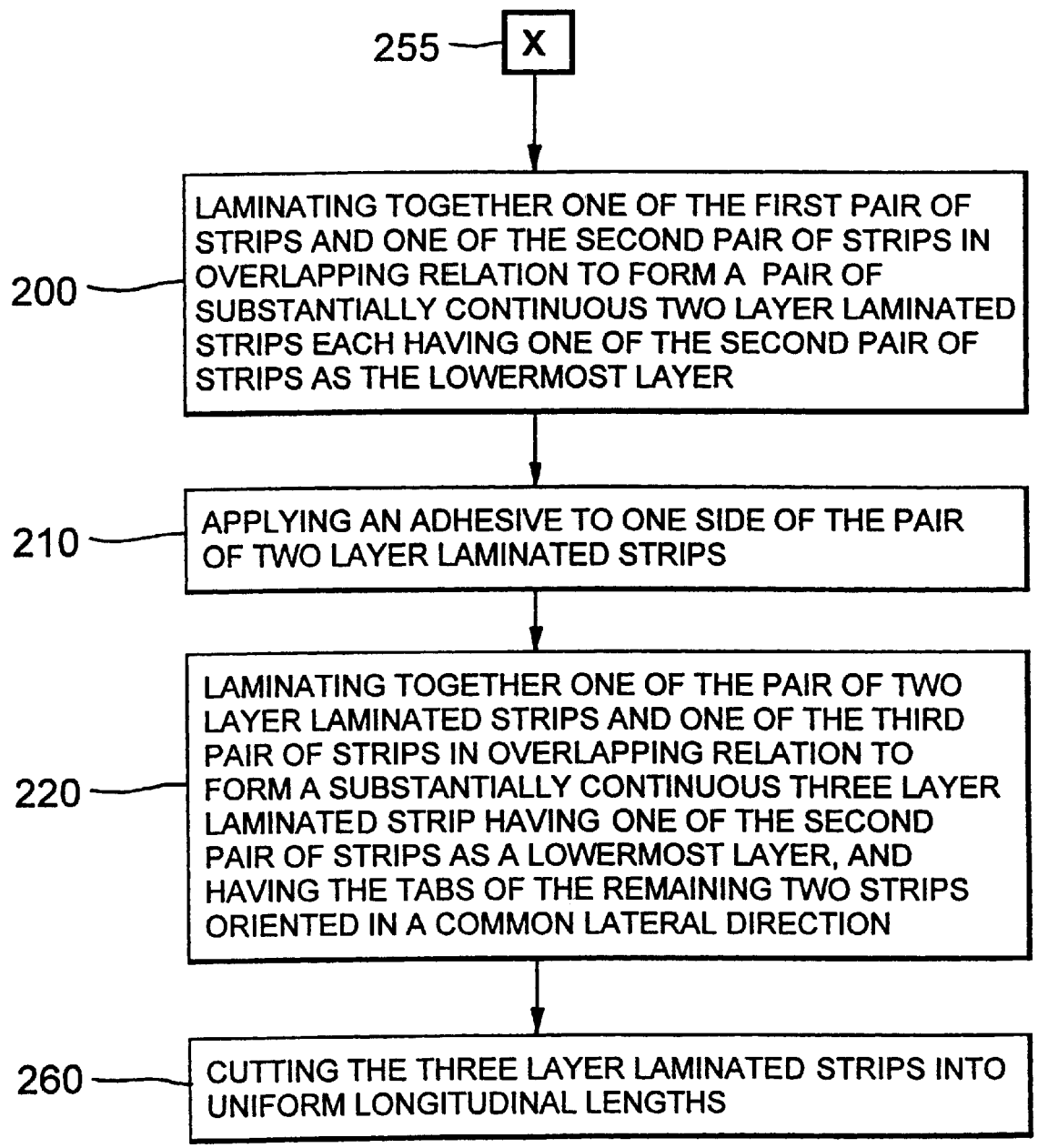

Referring now to FIGS. 9a–9b, a block diagram is provided which illustrates a method for making laminated roofing shingles according to another aspect of the current invention. This method provides for increased variation in the pattern of the tabs on the finished shingles compared to the methods previously described and illustrated in FIGS. 8a, 8b and 8c. This method can be practiced on the apparatus previously described and illustrated in FIG. 4 and FIGS. 5a–5e and on equivalent apparatus. Many steps in the method shown in FIGS. 9a–9b are equivalent to steps previously described in FIGS. 8a, 8b and 8c and therefore have the same reference number.

One step in the method of the current invention, as shown in block 150, is providing a substantially continuous sheet of composition material. As previously described for block 150, this sheet can be produced by conventional means known in the art. Another step in the method, shown by block 240, is cutting a first portion of the sheet to define a first pair of substantially continuous longitudinal strips have interdigitating tabs defining a first tab pattern and having a first pattern length. This operation can be performed by a first cutting station similar to cutting station 29 as previously described and shown in FIG. 4 and FIG. 5a, except that the first cutter drum would include a first zig-zag knife for cutting the first pair of strips with the first tab pattern but no disk shaped knives. Equivalent apparatus can also be used.

Another step in the method, shown by block 170, is separating the first pair of strips from the remainder of the sheet. This operation can be performed by separator rolls 48 as previously described and shown in FIG. 4, or by equivalent apparatus. Another step in the method, shown by block 180, is applying an adhesive to one side of the first pair of strips. This operation can be performed by an adhesive coating station 50 as previously described and shown in FIG. 4, or by equivalent apparatus.

Another step in the method, shown by block 250, is cutting in a single operation: (1) a second portion of the sheet to define a second pair of substantially continuous longitudinal strips; and (2) a third portion of the sheet to define a third pair of substantially continuous longitudinal strips having interdigitating tabs defining a second tab pattern and having a second pattern length, the second pattern length being different from the first pattern length. This operation can be performed by a second cutting station similar to cutting station 52 as previously described and shown in FIG. 4 and FIG. 5b, except that the second cutter drum would include three disk shaped knives for cutting the second pair of strips along with the second zig-zag knife for cutting the third pair of strips with the second tab pattern. Equivalent apparatus can also be used.

Another step in the method shown by block 190, is separating the second pair of strips from the remainder of the sheet. This operation may be performed by separator rolls 66 as previously described and shown in FIG. 4, or by equivalent apparatus.

The next block, designated block 255 and containing the reference letter "X", does not actually represent a step in the method, but rather is used to connect the block diagram on FIG. 9a to the block diagram on FIG. 9b which illustrates additional steps of the method. Referring now also to FIG. 9b, another step in the method, shown by block 200, is laminating together one of the first pair of the strips (for example, from block 240) and one of the second pair of strips (for example, from block 250) in overlapping relation to form a pair of substantially continuous two-layer laminate strips, each having one of the second pair of strips as the lowermost layer. This operation can be performed by a first laminating station 68 as previously described and shown in FIG. 4 and FIG. 5c, or by equivalent apparatus.

Another step in the method, shown by block 210, is applying an adhesive to one side of the pair of two-layer laminated strips. This operation can be performed by a second adhesive application station 78, as shown in FIG. 4, or by equivalent apparatus. Another step in the method, shown in block 220, is laminating together one of the pair of two-layer laminated strips (for example, from block 200) and one of the third pair of strips (for example, from block 250) in overlapping relation to form a substantially continuous three-layer laminate strip having one of the second pair of strips as a lowermost layer, and having the tabs of the remaining two strips oriented in a common lateral direction. This operation can be performed at a second laminating station 82 as previously described and shown in FIG. 4 and FIG. 5d, or by equivalent apparatus.

The final step in the current method, shown by block 260, is cutting the three-layer laminate strip (for example, from block 220) into uniform longitudinal lengths. This operation, which forms the individual laminated shingles, can be performed by equipment such as third cutting station 92 as previously described and shown in FIG. 4 and FIG. 5e, or by equivalent apparatus.

As with the methods illustrated in FIGS. 8a, 8b and 8c, it will be readily appreciated that some of the steps in the method illustrated in FIGS. 9a–9b can be performed in a different sequence without departing from the scope of the current invention. It will be further appreciated that certain substeps of the method illustrated in FIGS. 9a–9b, can be combined into different steps or performed as separate steps without departing from the scope of the current invention. For example, the block diagram shown in FIGS. 10a–10b illustrates an alternative embodiment of the invention shown in FIGS. 9a–9b.

Without redescribing in detail the steps which are common between the method shown in FIGS. 9a–9b and the method shown in FIGS. 10a–10b, the differences between these methods can be described as follows. As previously described, the method of FIGS. 9a–9b includes two cutting steps. The first cutting step, shown in block 240, is cutting a first portion of the sheet to define a first pair of substantially continuous longitudinal strips having interdigitating tabs defining a first tab pattern and having a first pattern length. The subsequent cutting step, shown in block 250, includes two substeps in a single operation, namely, the first substep is cutting a second portion of the sheet to define a second pair of substantially continuous longitudinal strips and the second substep is cutting (in the same operation) a third portion of the sheet to define a third pair of substantially continuous longitudinal strips having interdigitating tabs defining a second tab pattern and having a second pattern length, the second pattern length being different from the first pattern length. In the alternative method shown in FIGS. 10a–10b, the steps and substeps shown in blocks 240 and 250 of FIG. 9a have been recombined in a different manner as follows. As shown in FIG. 10a, the first cutting step, shown by block 270, comprises two substeps performed in a single operation, namely, a first substep is cutting a first portion of the sheet to define a first pair of substantially continuous longitudinal strips having interdigitating tabs defining a first tab pattern and having a first pattern length, and a second substep is cutting (in the same operation) a second portion of the sheet to define a second pair of substantially continuous longitudinal strips. The subsequent cutting operation of the method of FIG. 10a, shown by block 280, includes a single step, namely, cutting a third portion of the sheet to define a third pair of substantially continuous longitudinal strips having interdigitating tabs defining a second tab pattern and having a second pattern length, the second pattern length being different from the first pattern length. It will be readily apparent that this method can be practiced on an apparatus similar to that previously described and illustrated in FIGS. 4 and FIGS. 5a–5e, the first cutter station 29 including a first zig-zag knife 34 for cutting the first portion of the sheet and three disk shaped knives 41 for cutting a second portion of the sheet in a single operation (as per block 270) and a second cutting station 52 including only a second zig-zag knife 58 for cutting the third portion of the sheet to define the third pair of substantially continuous longitudinal strips (as per block 280). As with the previous methods described, equivalent apparatus could also be used to perform this method.

Figure 10A:
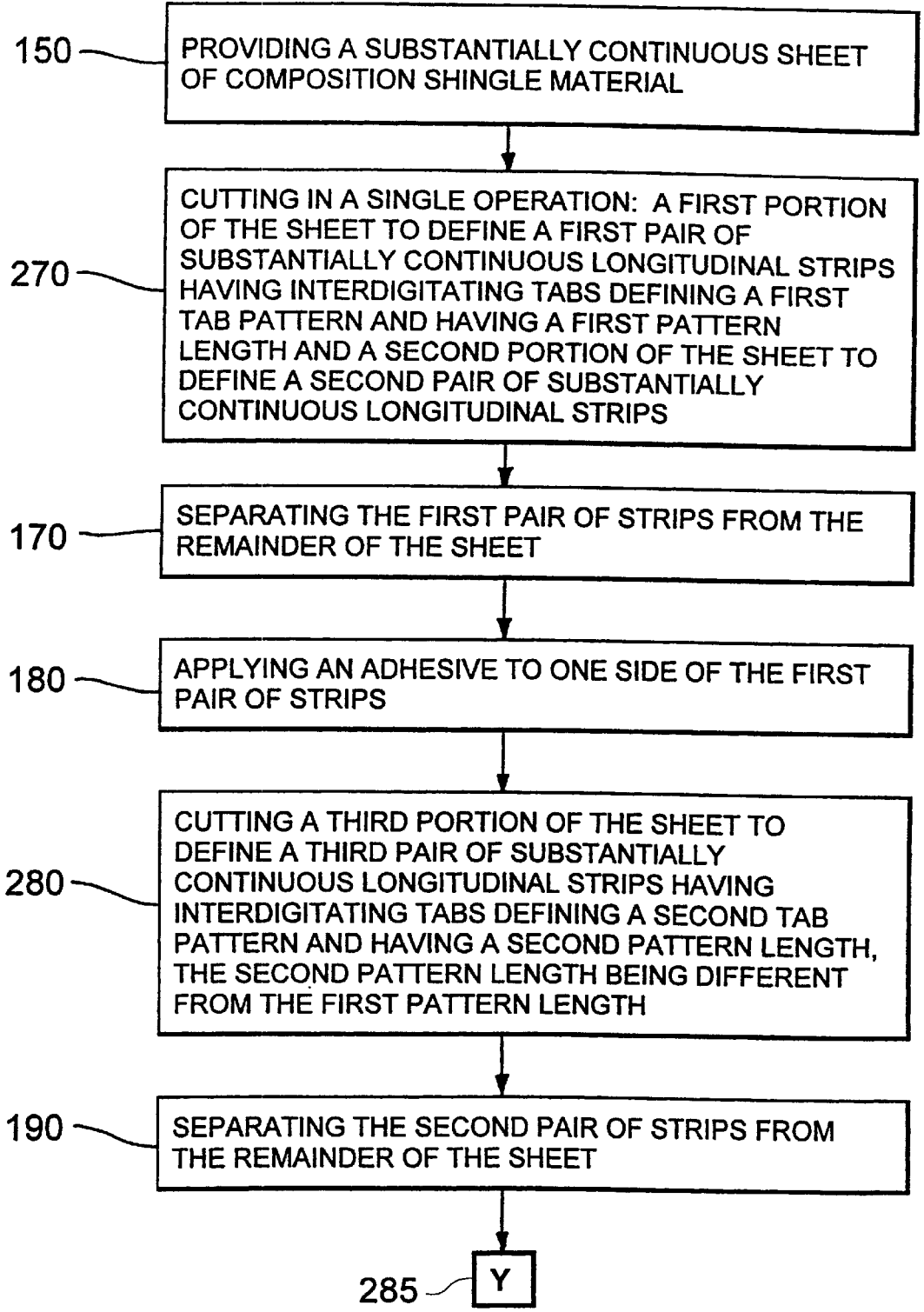
FIGS. 10a–10b are a block diagram of a method for producing laminated roofing shingles according to a further aspect of the current invention.
Figure 10B:
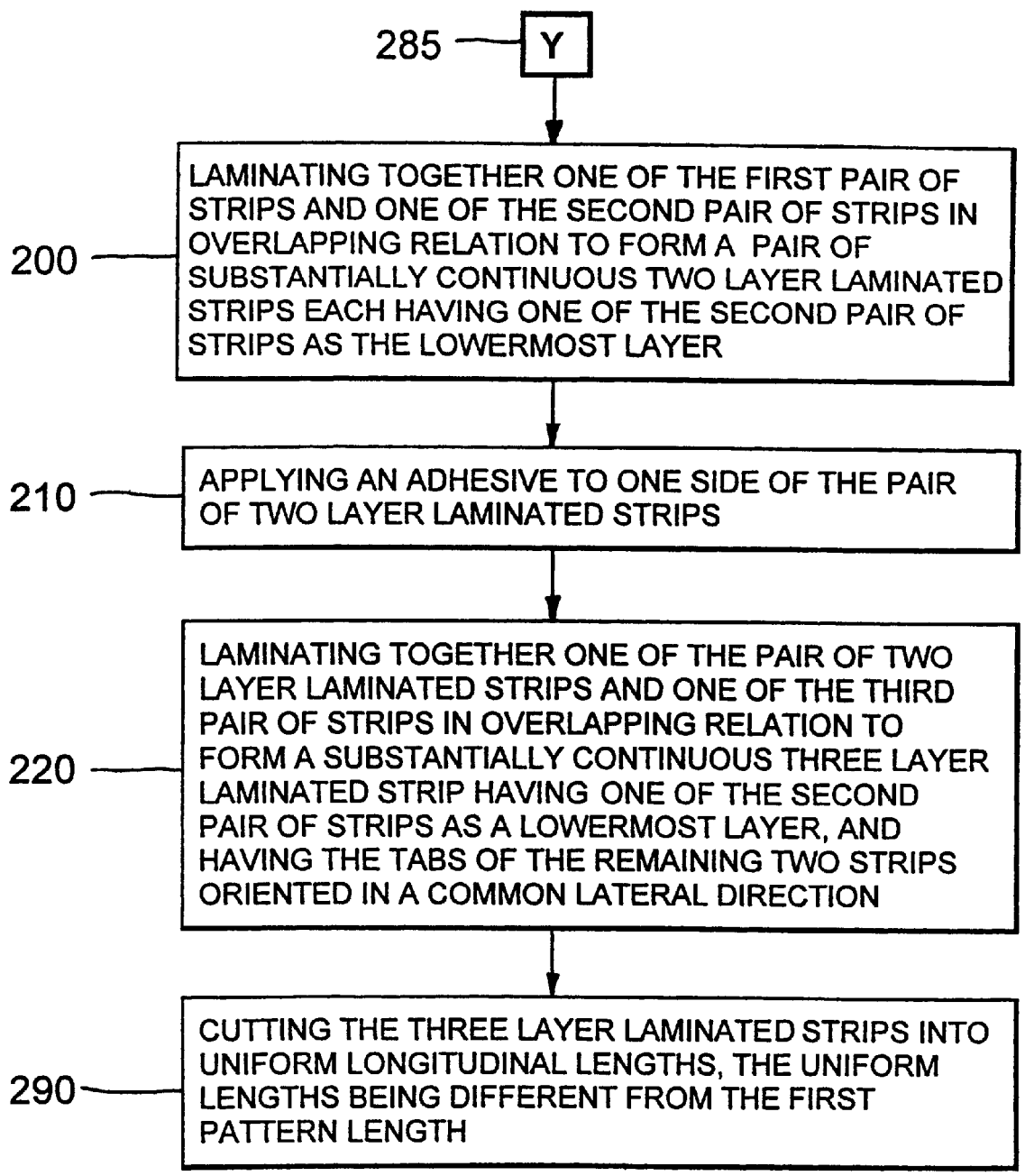

In addition, the final step in the method shown in FIGS. 10a–10b, shown by block 290, has also been modified from the method shown in FIGS. 9a–9b. The step shown in block 290 is cutting the three-layer laminate strip into uniform longitudinal lengths, uniform lengths being different from the first pattern length. This operation can be performed by a third cutting station, similar to cutting station 92 as previously described and shown in FIG. 4 and FIG. 5e, except that in the method of FIGS. 10a and 10b the diameter of cutter drum 94 is selected to be different from the diameter d, of first cutter drum 30 which establishes the first pattern length. Equivalent apparatus can also be used.

Figure 11A:
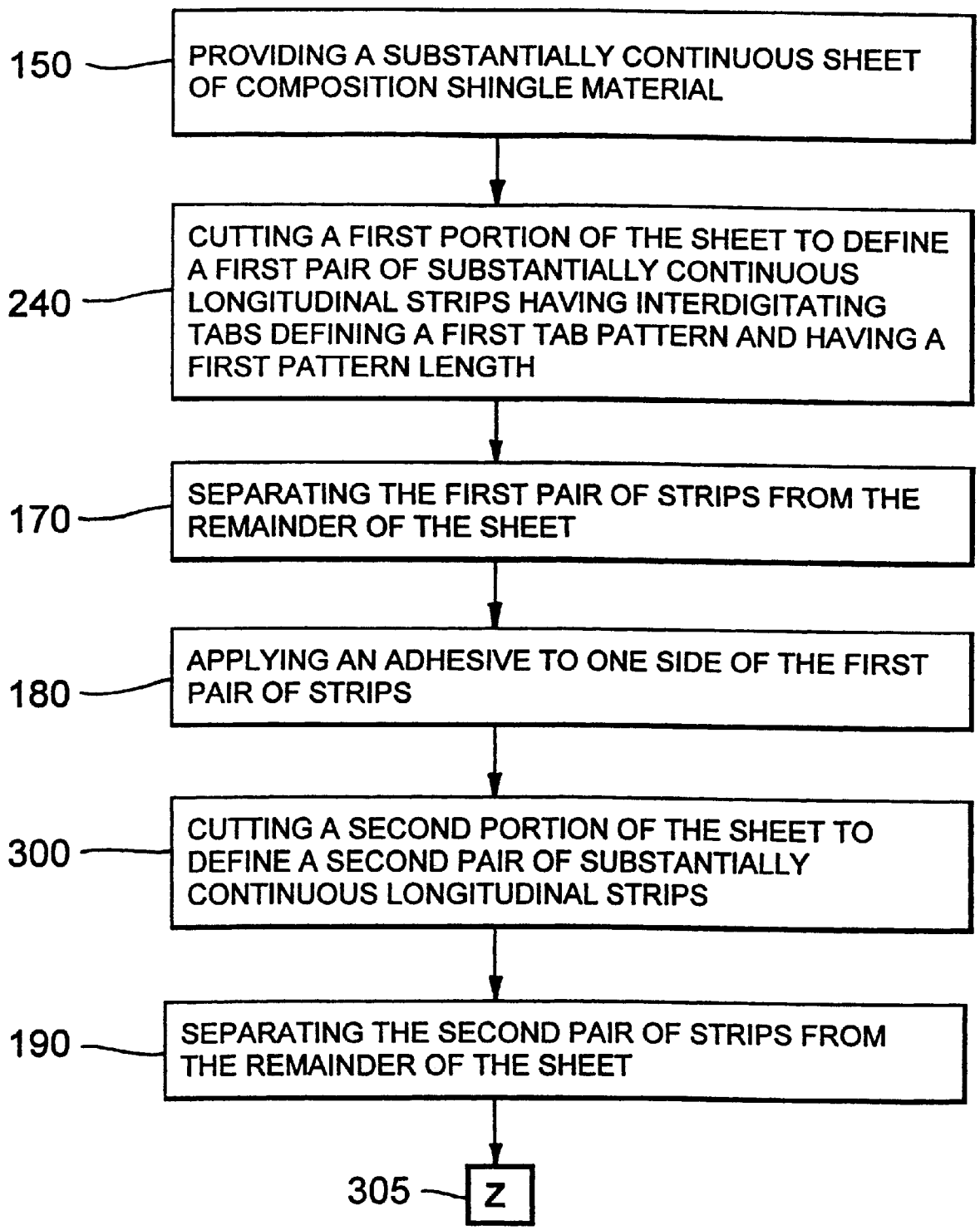
FIGS. 11a–11b are a block diagram of a method for producing laminated roofing shingles according to yet another aspect of the current invention.
Figure 11B:
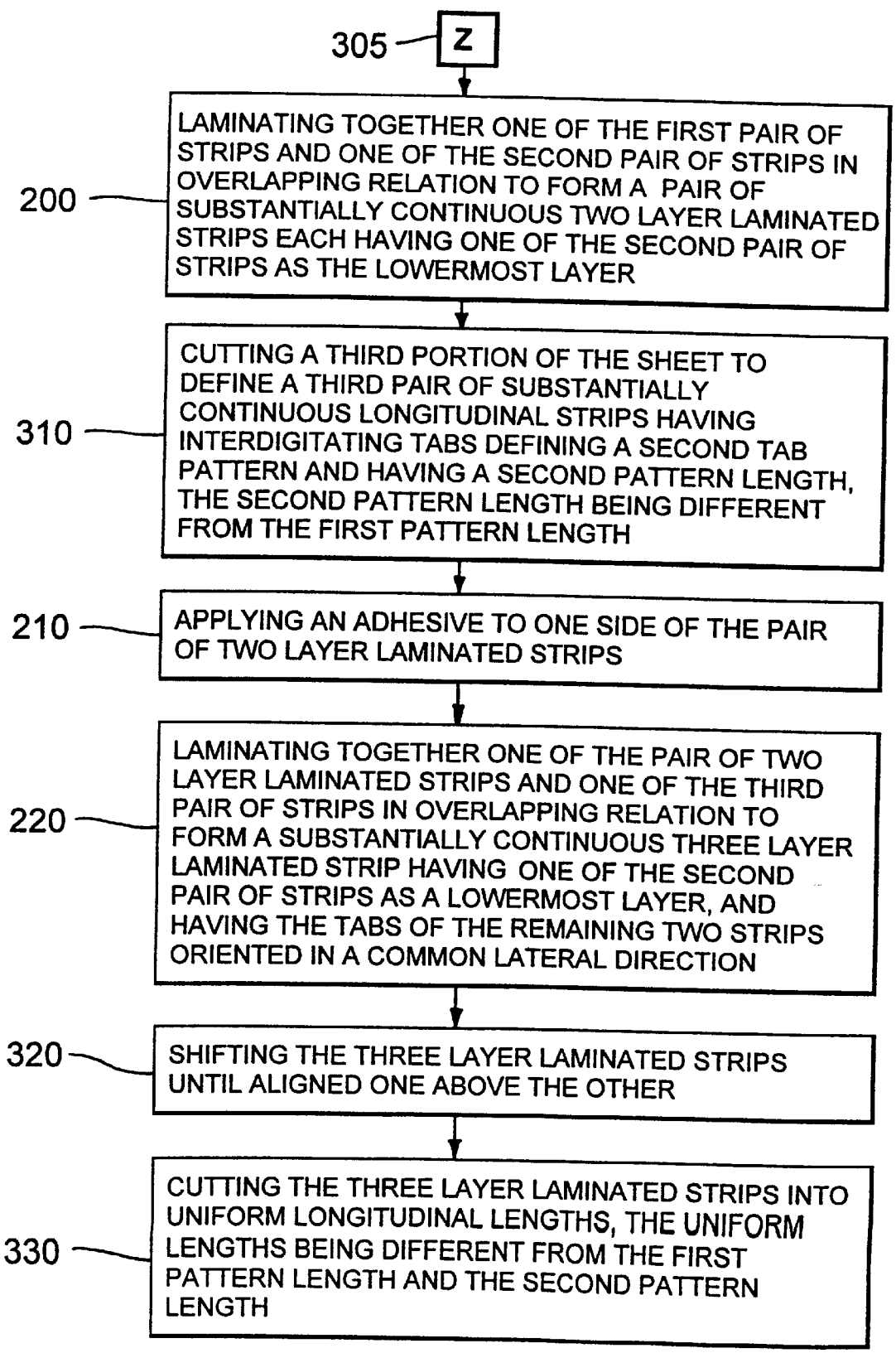

Referring now to FIGS. 11a–11b, a block diagram of a method for producing laminated roofing shingles according to yet another aspect of the current invention is provided. The method of FIGS. 11a–11b contains several steps which are in common with the methods of FIGS. 9a–9b and FIGS. 10a–10b and therefore have the same reference number. This method illustrates that the various steps and substeps of the methods previously described can be rearranged, recombined, or split apart without departing from the scope of the current invention.

Without redescribing in detail the steps which are in common between the methods shown in FIGS. 9a–9b, 10a–10b, and 11a–11b, the new aspects of the latter method relate primarily to the ordering of the cutting steps and substeps. The method of FIGS. 11a–11b contains three separate cutting steps. The first cutting step, shown in block 240, is equivalent to the first cutting step of the method in FIGS. 9a–9b, namely cutting a first portion of the sheet to define a first pair of substantially continuous longitudinal strips having interdigitating tabs defining a first tab pattern and having a first pattern length. This first cutting operation can be performed by a first cutting station, similar to cutting station 29 as previously described and shown in FIG. 4 and FIG. 5a, except that the first cutter drum would include a first zig-zag knife for cutting the first pair of strips with the first tab pattern, but no disk shaped knives. Equivalent apparatus can also be used.

The second cutting step of the method of FIGS. 11a–11b, shown in block 300, is cutting a second portion of the sheet to define a second pair of substantially continuous longitudinal strips. This operation can be performed by a second cutting station similar to cutting station 52 as previously described and shown in FIG. 4 and FIG. 5b, except that the second cutter drum would include three disk shaped knives for cutting the second pair of strips, rather than a zig-zag knife for cutting the third pair of strips. In addition, since the second cutter drum does not include a zig-zag knife, the diameter of the second cutter drum does not affect either the first pattern length and the second pattern length.

The third cutting step of the method of FIGS. 11a–11b, shown in block 310 in FIG. 11b, is cutting a third portion of the sheet to define a third pair of substantially continuous longitudinal strips having interdigitating tabs defining a second tab pattern and having a second pattern length, the second pattern length being different from the first pattern length. It will be readily appreciated, that this operation can be performed by a third cutter station (not shown) placed downstream of the second cutting station. The third cutting station can be similar to cutter station 52 as previously described and shown in FIG. 4 and FIG. 5b, except including only a second zig-zag knife 58 for cutting the third portion of the sheet to define a third pair of substantially continuous longitudinal strips. Thus, it will be seen that the method of FIGS. 11a–11b comprises three independent cutting operations as shown in blocks 240, 300, and 310, whereas the previously described methods of FIGS. 9a–9b and 10a–10b each included only two separate cutting operations.

The method of FIGS. 11a–11b further includes different steps relating to the final handling of the strips. One step, shown in block 320, is shifting the pair of three-layer laminated strips (resulting from the previous operation in block 220) until one of the three-layer laminated strips is aligned above the other three-layer laminated strip. This operation can be performed by a shifter apparatus 99 as previously described and shown in FIG. 3e, or by equivalent apparatus. The final step, shown in block 330, is cutting the three-layer laminated strips (now arranged one above the other) into uniform longitudinal lengths, the uniform lengths being different from the first pattern length and the second pattern length. This operation can be performed by a third cutting station, similar to cutting station 92 as previously described and shown in FIG. 4 and FIG. 5e, except that the diameter of cutter drum 94 is selected to be different from the diameter $d_1$ of the first cutter drum (for example, from block 240) which establishes the first pattern length, and also different from the diameter of the third cutter drum (for example, from block 310) which establishes the second pattern length. Equivalent apparatus can also be used.

It will further be understood that block 285 in FIGS. 10a–10b and block 305 in FIGS. 11a–11b do not represent actual steps, but rather serve to connect the block diagrams which extend across more than one figure.

Referring now to FIG. 6, a three-layer laminated shingle produced by the method and apparatus of the current invention is shown. FIG. 7 illustrates the shingle of FIG. 6 with the layers separated apart to further describe their structure. Shingle 120 comprises a top layer 122, a middle layer 124, and a bottom layer 126. The top layer 122 includes tabs 128 and cut-out areas 130 formed at one of the first cutter station 28 and the second cutter station 52 and having a tab pattern length equal to the circumference of the corresponding cutter drum. Similarly, middle layer 124 has tabs 132 and cut-out areas 134 formed by another of the first cutter station 28 and the second cutter station 52 with a second pattern length equal to the circumference of the corresponding cutter drum. When constructed in accordance with the method of the current invention, the shingle 120 will have a tab configuration having an extremely wide variation in terms of the layers exposed on the shingle and their placement along the shingle's length. For example, the shingle 120 in FIG. 6 has portions 136, 138, 140 and 142 exposing the bottom layer 126, portions 144 and 146 exposing the middle layer 124, and portion 148, 150, 152 and 154 exposing the top layer. When constructed according to the current invention, it is extremely unlikely that another shingle on an average roof will have the exact tab configuration shown on shingle 120. The variation among shingles is further increased when the length, L, of the shingle (FIG. 5e) is different from both the first pattern length and the second pattern length, since it greatly reduces the likelihood that either of the layers will be similar on different shingles.

Thus, there is disclosed a method and apparatus for making a laminated roofing shingle that overcomes the shortcomings and disadvantages of methods and apparatus disclosed in the prior art. While the foregoing embodiments of the invention have been disclosed with reference to preferred embodiments of the method and apparatus, it is to be understood that many changes in detail may be made as a matter of design choices, without departing from the spirit and scope of the invention, as defined by the appended claims.

What is claimed is:

1. An apparatus for use in a process of making laminated roofing shingles, comprising:

a first cutting station having a first cutting drum with a first diameter for cutting a first portion of a sheet of shingle material to define a first pair of longitudinal strips having interdigitating tabs, a period of the interdigitating tabs having a first pattern length;

a second cutting station having a second cutting drum with a second diameter for cutting a third portion of the sheet of shingle material to define a third pair of strips having interdigitating tabs, a period of the interdigitating tabs having a second pattern length, the second pattern length being different from the first pattern length; and a laminating station for laminating together one of the first pair of strips, one of a second pair of strips cut from a second portion of the sheet material at one of the first and second cutting stations, and one of the third pair of strips in overlapping relation to form a substantially continuous three-layer laminated strip in which one of the second pair of strips is the lowermost layer and having the tabs of the remaining two strips oriented in a common lateral direction, a third cutting station having a third cutting device for cutting the laminated strip into individual shingles having a predetermined length, wherein the predetermined length of the shingles is not an integer multiple of either the first or the second pattern lengths.

2. An apparatus according to claim 1, wherein said first pattern length is longer than the length of a finished shingle and said second pattern length is different from said first pattern length and said second pattern length is longer than the length of the finished shingle.

3. An apparatus according to claim 1 wherein said second diameter of said second cutting drum is different from said first diameter of said first cutting drum.

4. An apparatus according to claim 1, further comprising accessory rolls between one of said stations and said laminating station.

5. An apparatus according to claim 2, further comprising accessory rolls between one of said stations and said laminating station.

6. An apparatus according to claim 3, further comprising accessory rolls between one of said stations and said laminating station.

* * * * *

UNITED STATES PATENT AND TRADEMARK OFFICE
CERTIFICATE OF CORRECTION

| | | |
|---|---|---|
| PATENT NO. | : 6,220,329 B1 | Page 1 of 1 |
| DATED | : April 24, 2001 | |
| INVENTOR(S) | : Thomas M. King et al. | |

It is certified that error appears in the above-identified patent and that said Letters Patent is hereby corrected as shown below:

<u>Title page,</u>
"(73) Assignee:", delete "Tamko Roofin Products", and insert -- Tamko Roofing Products --.

Signed and Sealed this

Twenty-eighth Day of August, 2001

Attest:

*Attesting Officer*

NICHOLAS P. GODICI
*Acting Director of the United States Patent and Trademark Office*